(12) United States Patent
Karanam et al.

(10) Patent No.: US 12,475,320 B2
(45) Date of Patent: Nov. 18, 2025

(54) QUESTION ANSWERING VIA TAILORED KNOWLEDGE INDUCTION

(71) Applicant: International Business Machines Corporation, Armonk, NY (US)

(72) Inventors: Hima Prasad Karanam, Bangalore (IN); Shajith Ikbal Mohamed, Chennai (IN); Udit Sharma, Shimla (IN); Sumit Neelam, Agra (IN); L. Venkata Subramaniam, Gurgaon (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 18/304,899

(22) Filed: Apr. 21, 2023

(65) Prior Publication Data

US 2024/0354512 A1    Oct. 24, 2024

(51) Int. Cl.
*G06F 40/30* (2020.01)
*G06F 40/205* (2020.01)
*G06N 5/02* (2023.01)

(52) U.S. Cl.
CPC .......... *G06F 40/30* (2020.01); *G06F 40/205* (2020.01); *G06N 5/02* (2013.01)

(58) Field of Classification Search
None
See application file for complete search history.

(56) References Cited

U.S. PATENT DOCUMENTS

| | | | |
|---|---|---|---|
| 6,081,774 | A | 6/2000 | de Hita et al. |
| 6,714,939 | B2 | 3/2004 | Saldanha et al. |
| 7,174,507 | B2 | 2/2007 | Baudin et al. |
| 7,177,798 | B2 | 2/2007 | Hsu et al. |
| 2017/0139928 | A1 | 5/2017 | Neeman et al. |
| 2018/0101601 | A1 | 4/2018 | Brown et al. |
| 2020/0142991 | A1 | 5/2020 | Boxwell et al. |
| 2021/0073474 | A1* | 3/2021 | Sengupta .............. G06F 40/247 |
| 2021/0216577 | A1 | 7/2021 | Xiao et al. |
| 2021/0319066 | A1 | 10/2021 | Boxwell et al. |
| 2024/0330693 | A1* | 10/2024 | Quamar ................... G06N 3/08 |

OTHER PUBLICATIONS

Sun et al. | "Reasoning Over Virtual Knowledge Bases with Open Predicate Relations." arXiv:2102.07043v2 [cs.AI] Jun. 14, 2021, 12 pages.
Wolfson et al. | "Break it Down: a Question Understanding Benchmark." arXiv:2001.11770v1 [cs.CL] Jan. 31, 2020, 16 pages.
Weber et al. | "NLProlog: Reasoning with Weak Unification for Question Answering in Natural Language." arXiv:1906.06187v1 [cs.CL] Jun. 14, 2019, 11 pages.
(Continued)

*Primary Examiner* — Quynh H Nguyen
(74) *Attorney, Agent, or Firm* — Amin, Turocy & Watson, LLP

(57) ABSTRACT

Systems and techniques that facilitate question answering via tailored knowledge induction are provided. In various embodiments, a system can access a natural language question. In various aspects, the system can identify an answer for the natural language question, based on a tailored knowledge graph iteratively generated from a set of structured sub-queries associated with the natural language question.

19 Claims, 14 Drawing Sheets

(56) References Cited

OTHER PUBLICATIONS

Lu et al. | "Answering Complex Questions by Joining Multi-Document Evidence with Quasi Knowledge Graphs." arXiv:1908.00469v4 [cs.IR] Nov. 28, 2020, 10 pages.

Zhu, F. et al. | "Tat-QA: a Question Answering Benchmark on a Hybrid of Tabular and Textual Content in Finance." arXiv:2105.07624v2 [cs.CL] Jun. 1, 2021, 11 pages.

Chen, Zh. et al. | "FINQA: a Dataset of Numerical Reasoning over Financial Data." arXiv:2109.00122v3 [cs.CL] May 7, 2022, 14 pages.

Neelam S., et al. | "SYGMA: System for Generalizable Modular Question Answering Over Knowledge Bases." arXiv:2109.13430v1 [cs.CL] Sep. 28, 2021, 9 pages.

Kapanipathi, P. et al. | "Leveraging Abstract Meaning Representation for Knowledge Base Question Answering." arXiv:2012.01707v2 [cs.CL] Jun. 2, 2021, 11 pages.

Shu, Ch. et al. | "Logic-Consistency Text Generation from Semantic Parses." arXiv:2108.00577v1 [cs.CL] Aug. 2, 2021, 13 pages.

Nogueira R. et al. | Multi-Stage Document Ranking with BERT. arXiv:1910.14424v1 [cs.IR] Oct. 31, 2019, 13 pages.

STARDOG | Webpage https://www.stardog.com/, last accessed Apr. 18, 2023, 7 pages.

BLAZEGRAPH | Webpage https://blazegraph.com/, last accessed Apr. 18, 2023, 1 page.

* cited by examiner

802 — MOVIE is a drama romantic comedy film written and directed by PERSON-A and produced by PERSON-B for STUDIO, a subsidiary of COMPANY-1.

804 — Based on PERSON-A's best-selling novel of the same name, the story is set in STATE circa 1970s.

806 — The film had its world premiere at FESTIVAL.

808 — PERSON-A is a best-selling author of many books, television writer, film director, and entrepreneur based in Greenwich Village, New York City.

810 — PERSON-A has published a novel per year since 2000.

FIG. 8

1002 — PERSON-C (born in 1970) is a model from Pennsylvania. She has appeared on the covers of various popular magazines.

1004 — PERSON-C has been photographed by multiple photographers, and has had an extensive and successful modeling career.

1006 — A long time vegetarian and an advocate for organic lifestyle choices and natural healthcare, PERSON-C co-founded COMPANY-2, a company that creates and sells vegan, organic perfume and skin care products.

1008 — PERSON-D (born in 1965) is a fashion and portrait photographer who has shot advertising campaigns for various companies.

1010 — PERSON-D has done work for many prominent magazines.

FIG. 10

QUESTION ANSWERING VIA TAILORED KNOWLEDGE INDUCTION

BACKGROUND

The subject disclosure relates to question answering, and more specifically to question answering via tailored knowledge induction.

In computing, question answering can involve automatically determining an answer to a natural language question. Some existing techniques facilitate question answering via knowledge graphs. Such existing techniques operate by converting the natural language question into a structured query and identifying an answer to the natural language question by executing the structured query on a knowledge graph. In some cases, the knowledge graph is pre-curated to represent various areas of substantive knowledge. In other cases, the knowledge graph is generated from triplets extracted from a corpus of natural language documents. Such existing techniques are easily explainable/interpretable and can thus be considered as white-box techniques. Furthermore, such existing techniques can be considered as well-equipped to handle complex reasoning. Unfortunately, however, such existing techniques can be considered as disadvantageous, since the knowledge graph of such existing techniques can include information that is not necessary to answer the natural language question. Other existing techniques facilitate question answering via deep learning. Such other existing techniques operate by feeding both the natural language question and the corpus as input to a trained deep learning pipeline, which can cause the trained deep learning pipeline to produce as output an answer to the natural language question. Such other existing techniques can achieve powerful performance. Unfortunately, however, such other existing techniques are not easily explainable/interpretable and can thus be considered as black-box techniques. Moreover, such other existing techniques can be considered as poorly-equipped to handle complex reasoning.

Accordingly, systems or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, methods, or apparatuses that can facilitate question answering via tailored knowledge induction are described.

According to one or more embodiments, a system is provided. In various aspects, the system can comprise a processor that can execute computer-executable components stored in a non-transitory computer-readable memory. In various instances, the computer-executable components can comprise an access component that can access a natural language question. In various cases, the computer-executable components can comprise an answer component that can identify an answer for the natural language question, based on a tailored knowledge graph iteratively generated from a set of structured sub-queries associated with the natural language question.

According to various embodiments, the above-described system can be implemented as a computer-implemented method or as a computer program product.

DESCRIPTION OF THE DRAWINGS

FIGS. 8-11 illustrate non-limiting examples showing how various aspects can be applied to real-world natural language questions in accordance with one or more embodiments described herein.

DETAILED DESCRIPTION

Figure 1:
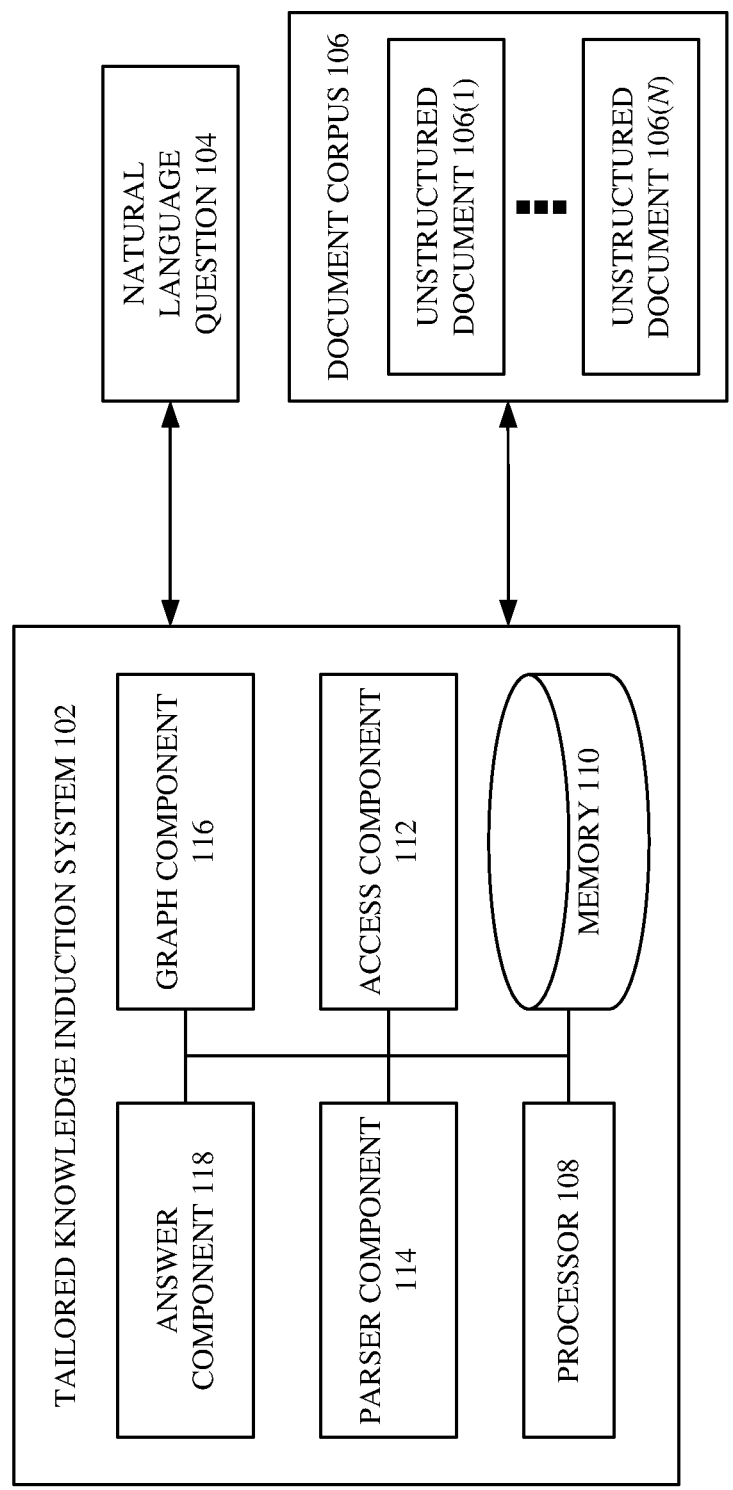
FIG. 1 illustrates a block diagram of an example, non-limiting system that facilitates question answering via tailored knowledge induction in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In computing, question answering (e.g., also referred to as query answering) can involve automatically determining an answer to a natural language (e.g., unstructured, plain text) question.

Some existing techniques facilitate question answering via knowledge graphs. Such existing techniques can convert the natural language question into a structured query and can execute the structured query on a knowledge graph, thereby yielding or identifying an answer for the natural language question. In various instances, the knowledge graph of such existing techniques can be an extensive, pre-curated knowledge graph representing numerous substantive areas of knowledge (e.g., Wikidata, DBpedia). In other instances, the knowledge graph of such existing techniques can be crafted by extracting triplets (e.g., noun-relation-noun tuples) from a corpus (e.g., collection) of natural language documents (e.g., each natural language document can be one or more unstructured or plain text sentences or sentence fragments). Indeed, nouns of such triplets can be considered as defining or denoting nodes of the knowledge graph, and relations of such triplets can be considered as defining or denoting edges of the knowledge graph.

Such existing techniques are easily explainable/interpretable (e.g., the answer to the natural language question can predictably or understandably depend upon the nodes and edges of the constructed knowledge graph). Accordingly, such existing techniques can be considered as being of a transparent, white-box type.

Furthermore, such existing techniques can be considered as well-equipped to handle complex reasoning. In particular, a question can pertain to complex reasoning if that question involves identifying one or more query parameters and subsequently comparing those one or more query parameters with each other or with defined thresholds (e.g., complex reasoning can involve arithmetically comparing identified numerical quantities with each other or with defined numerical thresholds, temporally comparing identified times/dates with each other or with defined threshold times/dates, or taxonomically comparing identified hypernyms/hyponyms with each other or with defined threshold hypernyms/hyponyms). Accordingly, such two or more query parameters can be identified in or selected from the constructed knowledge graph (e.g., such two or more query parameters can correspond to respective nodes or edges of the knowledge graph), and such two or more query parameters can be appropriately compared.

Unfortunately, however, such existing techniques can be considered as incorporating information that is not needed to answer the natural language question. After all, if such existing techniques utilize an extensive, pre-curated knowledge graph, such knowledge graph can be considered as containing large swaths of information that are not necessary or helpful for answering the natural language question (e.g., such an extensive, pre-curated knowledge graph can be considered as a generic database containing information that might answer very many different types of questions). Similarly, if such existing techniques instead generate the knowledge graph from triplets extracted from the corpus, such existing techniques can extract triplets from the corpus that are not necessary or helpful for answering the natural language question. Indeed, such existing techniques can attempt to extract all possible triplets from the corpus and not just those triplets that are pertinent to the natural language question. Furthermore, in situations where triplet extraction is implemented, such existing techniques can involve manual intervention to remove or eliminate irrelevant (e.g., noisy) triplets.

Other existing techniques facilitate question answering via deep learning. Such other existing techniques can train (e.g., via supervised training, unsupervised training, or reinforcement learning) a deep learning pipeline (e.g., one or more deep learning neural networks arranged serially or in parallel with each other) to receive as input plain text questions and plain text documents and to produce as output answers to such plain text questions. Accordingly, such other existing techniques can execute the deep learning pipeline on both the natural language question and the corpus, and such execution can cause the deep learning pipeline to generate an answer to the natural language question.

Such other existing techniques can achieve powerful performance. Indeed, such other existing techniques can achieve higher question answering accuracy, precision, or generalizability as compared to existing techniques that implement knowledge graphs.

Unfortunately, however, such other existing techniques are not easily explainable/interpretable. In particular, the answer to the natural language question can depend upon internal parameters (e.g., weight matrices, bias values, convolutional kernels) of the deep learning pipeline. But the deep learning pipeline can have hundreds, thousands, or even millions of internal parameters, and so it can be unclear or otherwise not easily understood how specific internal parameters individually affect or influence the answer. Accordingly, such existing techniques can be considered as being of an opaque, black-box type.

Moreover, such other existing techniques can be considered as being poorly-equipped to handle complex reasoning. As mentioned above, a question can pertain to complex reasoning if that question involves identifying one or more query parameters and subsequently comparing those one or more query parameters with each other or with defined thresholds. Although the deep learning pipeline can identify as output such one or more query parameters, the deep learning pipeline cannot be configured to compare such one or more query parameters without specialized, non-generalizable training or architecture modifications.

For at least these reasons, existing techniques for facilitating question answering can be considered as suffering from various technical problems. Accordingly, systems or techniques that can address one or more of these technical problems can be desirable.

Various embodiments described herein can address one or more of these technical problems. Specifically, various embodiments described herein can facilitate question answering via tailored knowledge induction. In particular, when given a document corpus and a natural language question, various embodiments described herein can involve iteratively constructing, from the document corpus, a knowledge graph that is tailored to the natural language question. In other words, the knowledge graph can be considered as containing information from the document corpus that is relevant, pertinent, or helpful to answer the natural language question and as excluding information from the document corpus that is irrelevant, impertinent, or unhelpful to answer the natural language question.

More specifically, various embodiments can involve initializing the knowledge graph to be empty and converting the natural language question into a logical query comprising multiple structured sub-queries. In various aspects, the logical query may or may not involve complex reasoning, but each of the multiple structured sub-queries can involve non-complex reasoning (e.g., each structured sub-query can be a triplet having one, two, or at most three unfilled or empty query parameter slots). Various embodiments can further involve iterating through the multiple structured sub-queries (e.g., in order of increasing number of unfilled or empty query parameter slots). For each structured sub-query, various embodiments can convert that structured sub-query to plain text, can fetch from the document corpus one or more documents that are relevant to the plain text of that structured sub-query, can identify via deep learning or triplet extraction a sub-answer to that structured sub-query based on the one or more fetched documents, can insert new nodes or edges into the knowledge graph based on the sub-answer, and can slot-fill a remainder of the logical query based on the sub-answer. After such iteration is performed for each structured sub-query, the knowledge graph can be considered as being complete. Accordingly, various embodiments can involve executing the logical query on the knowledge graph, thereby yielding an answer for the natural language question.

Note that iteratively or incrementally building the knowledge graph as described herein can cause the knowledge graph to exhibit a smaller or otherwise reduced size, as compared to existing techniques. Indeed, as described herein, the knowledge graph can contain or represent whatever information within the document corpus answers the multiple structured sub-queries and can exclude whatever information within the document corpus does not answer the multiple structured sub-queries. Since the multiple structured sub-queries make up the logical query, and thus make up the natural language question, the knowledge graph can be considered as omitting whatever information in the document corpus is extraneous or unnecessary for answering the natural language question. Hence, the knowledge graph can be considered as being tailored to the natural language question. Contrast this with existing knowledge graph techniques that would either: utilize expansive, pre-curated knowledge graphs that contain voluminous information that is irrelevant to the natural language question; or that would instead extract triplets from the document corpus and rely upon manual intervention to filter out triplets that are irrelevant for answering the natural language question.

Furthermore, note that various embodiments described herein can be considered as benefiting from both knowledge graphs and deep learning. Indeed, as mentioned above, various embodiments can involve iteratively constructing the tailored knowledge graph and subsequently answering the natural language question by executing over the tailored knowledge graph. Accordingly, such embodiments can be considered as exhibiting various benefits of knowledge graph question answering techniques, such as improved interpretability/transparency and complex reasoning capabilities. Furthermore, as mentioned above, such embodiments can facilitate the iterative construction of the tailored knowledge graph by decomposing the natural language question into multiple structured sub-queries and utilizing deep learning (or triplet extraction) to identify a respective sub-answer for each structured sub-query. Thus, such embodiments can also be considered as exhibiting various benefits of deep learning question answering techniques, such as improved performance/accuracy. In other words, various embodiments described herein can be considered as a hybrid technique that heightens both the transparency and the complex reasoning capabilities of deep learning by leveraging knowledge graphs.

Various embodiments described herein can be considered as a computerized tool (e.g., any suitable combination of computer-executable hardware or computer-executable software) that can facilitate question answering via tailored knowledge induction. In various aspects, such a computerized tool can comprise an access component, a parser component, a graph component, or an answer component.

In various embodiments, there can be a natural language question. In various aspects, the natural language question can be any suitable string of unstructured text that forms or otherwise amounts to an interrogative sentence. In various instances, the natural language question can be written in any suitable language (e.g., English). In various cases, the natural language question can be typed, selected, or otherwise provided (e.g., via a speech-to-text transcription system) by a user of any suitable computing device (e.g., can be typed or spoken by the user into a smart phone, can be typed by a user into a desktop computer, can be typed or spoken by a user into a laptop computer, can be spoken by a user into a vehicle-integrated computer).

In various embodiments, there can be a document corpus. In various aspects, the document corpus can comprise any suitable number of unstructured documents. In various instances, an unstructured document can be any suitable string of unstructured text that forms or otherwise amounts to one or more sentences or sentence fragments (e.g., one or more declarative sentences or sentence fragments). In various cases, the document corpus can be considered as a searchable library or collection of known information.

In various embodiments, it can be desired to automatically determine an answer to the natural language question. In various aspects, the computerized tool described herein can automatically provide such answer based on the document corpus.

In various embodiments, the access component of the computerized tool can electronically receive or otherwise electronically access the natural language question or the document corpus. In some aspects, the access component can electronically retrieve the natural language question or the document corpus from any suitable centralized or decentralized data structures (e.g., graph data structures, relational data structures, hybrid data structures), whether remote from or local to the access component. In any case, the access component can electronically obtain or access the natural language question or the document corpus, such that other components of the computerized tool can electronically interact with (e.g., read, write, edit, copy, manipulate) the natural language question or the document corpus.

In various embodiments, the parser component of the computerized tool can electronically convert the natural language question into a logical query (e.g., into a structured format such as structured query language (SQL) or standard query language and protocol for linked open data on web or resource description framework triple-stores (SPARQL)). In various aspects, the parser component can facilitate such conversion via any suitable semantic parsing technique (e.g., system for generalizable modular question answering (SYGMA), abstract meaning representation (AMR), modular techniques for SQL or SPARQL). In various instances, the logical query can be considered as a structured version (e.g., as a SQL-version or a SPARQL-version) of the natural language question. In various cases, the logical query can comprise a set of structured sub-queries. In various aspects, each structured sub-query can be considered as a discrete, constituent part or portion of the logical query. In various instances, the logical query may or may not involve complex reasoning (e.g., may or may not ask that one or more unknown or variable query parameters be identified and then numerically, temporally, or taxonomically compared with each other or with defined thresholds). In contrast, each of the set of structured sub-queries can involve non-complex reasoning (e.g., can merely ask that one or more unknown or variable query parameters be identified, without asking that such query parameters subsequently be numerically, temporally, or taxonomically compared with each other or with defined thresholds).

Indeed, in some instances, each structured sub-query can be formatted as a semantic triplet that has at most three missing, unfilled, or otherwise empty query parameter slots. As mentioned above, a semantic triplet can be a noun-relation-noun tuple. In other words, the semantic triplet can have a first noun slot, a second noun slot, and a relation slot. In some cases, all of such slots can be filled. In such situation, the semantic triplet can be considered as declaring that the content of the first noun slot and the content of the second noun slot relate to each other according to the content of the relation slot. In other cases, one or more of such slots can be empty. In such situation, the semantic triplet can be considered as asking what those one or more empty slots should be filled with, given the filled slots (if any) of the semantic triplet. For example, suppose that the first noun slot and the second noun slot are filled but that the relation slot is empty. In such case, the semantic triplet can be considered as asking what the relation slot should be filled with, given that the first noun slot and the second noun slotted are filled (e.g., can be considered as asking how two known nouns relate to each other). As another example, suppose that the first noun slot and the relation slot are filled but that the second noun slot is empty. In such case, the semantic triplet can be considered as asking what the second noun slot should be filled with, given that the first noun slot and the relation slot are filled (e.g., can be considered as asking what noun has some known relation with some other, known noun). As yet another example, suppose that the first noun slot and the second noun slot are empty but that the relation slot is filled. In such case, the semantic triplet can be considered as asking what the first noun slot and the second noun slot should be filled with, given that the relation slot is filled (e.g., can be considered as asking what two nouns have some known relation with each other).

Note that, even if some of the set of structured sub-queries initially have two or three empty or unfilled parameter slots, there can nevertheless be at least one structured sub-query that initially has merely one empty or unfilled parameter slot. Indeed, whatever semantic parsing technique is implemented by the graph component can fill the other two parameter slots of that at least one structured sub-query with appropriate textual information that is present in the natural language question.

Furthermore, note that various of the set of structured sub-queries can be daisy-chained together via shared empty parameter slots. For example, a first structured sub-query can ask what first unknown noun has a known relation with some known noun. Additionally, a second structured sub-query can ask what second unknown noun has a known relation with that first unknown noun (e.g., the first unknown noun can be referred to by any suitable variable identifier). In such case, the first unknown noun can be considered as an empty parameter slot that is shared between the first structured sub-query and the second structured sub-query. Thus, the first structured sub-query and the second structured sub-query can be considered as being chained or linked together by that first unknown noun. In other words, an empty parameter slot can, in various aspects, be referenced by or otherwise present in more than one structured sub-query.

In any case, the parser component can generate the logical query, and thus the set of structured sub-queries, by applying semantic parsing to the natural language question.

In various embodiments, the graph component of the computerized tool can electronically generate a tailored knowledge graph, based on the document corpus and based on the logical query. In particular, the tailored knowledge graph can begin as an initially empty graph structure (e.g., comprising zero nodes and zero edges), and the graph component can incrementally construct the tailored knowledge graph, by iterating through each of the set of structured sub-queries.

More specifically, the graph component can select any given structured sub-query from the set of structured sub-queries. In some instances, the graph component can select from the set of structured sub-queries in order of increasing number of empty or unfilled parameter slots. Accordingly, the graph component can first select any structured sub-query having one missing or empty parameter slot before selecting any structured sub-query having two or more missing or empty parameter slots. In any case, the graph component can select a given structured sub-query.

In various aspects, the graph component can convert the given structured sub-query into unstructured text (e.g., into a natural language interrogative sentence). In various instances, the graph component can accomplish such conversion via any suitable inverse of semantic parsing (e.g., via a SNOWBALL framework for logic-consistency text generation).

In various cases, the graph component can fetch, from the document corpus, one or more unstructured documents that are pertinent or relevant to the unstructured text, and thus that are pertinent or relevant to the given structured sub-query. In various aspects, the graph component can accomplish such fetching via any suitable document fetching technique (e.g., via multi-stage document ranking using bidirectional encoder representations from transformers (BERT)).

In various instances, the graph component can generate a sub-answer to the given structured sub-query, based on the one or more fetched unstructured documents. In various cases, the graph component can facilitate such generation via any suitable deep learning techniques. In particular, the graph component can store, maintain, control, or otherwise access any suitable deep learning pipeline. In various aspects, the deep learning pipeline can exhibit any suitable internal architecture. For example, the deep learning pipeline can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the deep learning pipeline can include any suitable numbers of neurons in various layers (e.g., different layers can have the same or different numbers of neurons as each other). As yet another example, the deep learning pipeline can include any suitable activation functions (e.g., softmax, sigmoid, hyperbolic tangent, rectified linear unit) in various neurons (e.g., different neurons can have the same or different activation functions as each other). As still another example, the deep learning pipeline can include any suitable interneuron connections or interlayer connections (e.g., forward connections, skip connections, recurrent connections).

In any case, the deep learning pipeline can be configured to perform natural language question answering. Accordingly, in various aspects, the graph component can execute the deep learning pipeline on the unstructured text and on the one or more fetched unstructured documents, and such execution can cause the deep learning pipeline to produce as output the sub-answer to the given structured sub-query. More specifically, the graph component can feed both the unstructured text and the one or more fetched unstructured documents to an input layer of the deep learning pipeline, the unstructured text and the one or more fetched unstructured documents can complete a forward pass through one or more hidden layers of the deep learning pipeline, and an output layer of the deep learning pipeline can compute the sub-answer based on activations from the one or more hidden layers.

Note that, in various instances, the deep learning pipeline can have been trained to perform natural language question answering via any suitable training paradigm (e.g., supervised learning based on annotated training data, unsupervised learning based on unannotated training data, reinforcement learning) and according to any suitable training hyperparameters (e.g., via any suitable backpropagation technique such as stochastic gradient descent; via any suitable loss or objective function such as mean absolute error (MAE), mean squared error (MSE), or cross-entropy; via any suitable training termination criterion; via any suitable training batch sizes). Accordingly, the deep learning pipeline can have any suitable trainable internal parameters (e.g., weight matrices, bias values, convolutional kernels), and such trainable internal parameters can have been iteratively or incrementally updated via such training to accurately or precisely perform natural language question answering.

Note that this discussion of deep learning is a mere non-limiting example. In various instances, the graph component can instead generate the sub-answer by applying any suitable semantic triplet extraction technique to the one or more fetched unstructured documents.

In any case, the graph component can generate the sub-answer to the given structured sub-query, based on the one or more fetched unstructured documents.

In various aspects, the graph component can slot-fill the logical query using the sub-answer. Indeed, as mentioned above, the given structured sub-query can be a triplet that has one missing or empty parameter slot. In various instances, the sub-answer can be considered as textual content that can or should fill that missing or empty parameter slot (e.g., the sub-answer can be a specific noun that can fill an empty or missing noun slot in the given structured sub-query; the sub-answer can be a specific relation that can fill an empty or missing relation slot in the given structured sub-query). Accordingly, the graph component can fill the empty or missing parameter slot of the given structured sub-query with the sub-answer. Moreover, as mentioned above, that empty or missing parameter slot might be referenced or otherwise contained in other portions of the logical query (e.g., in others of the set of structured sub-queries). Accordingly, the graph component can fill those other, shared instances of the empty parameter slot with the sub-answer. In various aspects, this can be referred to as slot-filling the logical query (e.g., as slot-filling the given structured sub-query, as slot-filling any others of the set of structured sub-queries, or as slot-filling any other applicable portions of the logical query).

In various aspects, the graph component can insert into the tailored knowledge graph one or more new nodes or edges, based on the sub-answer. Indeed, due to slot-filling, the sub-answer can be considered as completing the given structured sub-query, such that the given structured sub-query can now be considered as a fully filled triplet indicating an identified relation between two identified nouns.

So, in various aspects, the graph component can check whether the tailored knowledge graph has two nodes and an edge that respectively correspond to those two identified nouns and the identified relation. If an identified noun in the given structured sub-query is not represented by a distinct, corresponding node in the tailored knowledge graph, the graph component can insert such a node into the tailored knowledge graph. Likewise, if the identified relation in the given structured sub-query is not represented by a distinct, corresponding edge between appropriate nodes in the tailored knowledge graph, the graph component can insert such an edge into the tailored knowledge graph. In this way, the information contained within or represented by the tailored knowledge graph can be incrementally increased, based on the sub-answer and the given structured sub-query.

In various aspects, the graph component can repeat the above-described procedure (e.g., conversion into unstructured text, fetching of relevant unstructured documents, computation of sub-answer via deep learning or triplet extraction, insertion of new nodes or edges into the tailored knowledge graph, slot-filling of the logical query) for each of the set of structured sub-queries. Such repetition can cause all empty or missing parameter slots within the logical query to be filled. Indeed, note that the repeated slot-filling mentioned above can cause there to always be at least one structured sub-query that has one missing or empty parameter slot, until all missing or empty slot queries have been filled. Moreover, such repetition can cause the tailored knowledge graph to be iteratively enlarged with information from the document corpus that is relevant to the logical query (e.g., that answers the set of structured sub-queries). In other words, such repetition can cause the tailored knowledge graph to omit or otherwise exclude information from the document corpus that is irrelevant to the logical query (e.g., that does not answer the set of structured sub-queries). Indeed, each of the structured sub-queries can be considered as a triplet that initially has between one and three empty or missing parameter slots and that is extracted from the natural language question. The above-described procedure performable by the graph component fills the empty slots of those triplets using the document corpus and builds the tailored knowledge graph with those triplets. Contrast this with various existing knowledge graph question answering techniques, which would either: utilize expansive, pre-curated knowledge graphs that contain volumes of irrelevant information; or rely upon manual intervention to eliminate noisy triplets (e.g., triplets that have no bearing on the natural language question).

In any case, the graph component can generate the tailored knowledge graph based on the logical query and the document corpus.

In various embodiments, the answer component of the computerized tool can electronically generate or identify an answer to the natural language question, based on the tailored knowledge graph. More specifically, the answer component can execute (e.g., in STARDOG® or BLAZEGRAPH® fashion) the logical query on or over the tailored knowledge graph, and such execution can yield the answer. In various aspects, the answer can be any suitable text string (e.g., one or more words, sentences, or sentence fragments) that can be considered as a semantic or substantive response to the natural language question. Note that execution over the tailored knowledge graph can be performed, regardless of whether the logical query incorporates complex reasoning (e.g., again, knowledge graph execution can be considered as well-suited for complex reasoning). In various instances, the answer component can render the answer on any suitable electronic display. In various cases, the answer component can transmit the answer to any suitable computing device.

Various embodiments described herein can be employed to use hardware or software to solve problems that are highly technical in nature (e.g., to facilitate question answering via tailored knowledge induction), that are not abstract and that cannot be performed as a set of mental acts by a human. Further, some of the processes performed can be performed by a specialized computer (e.g., knowledge graphs, deep learning pipelines). In various aspects, some defined tasks associated with various embodiments described herein can include: accessing, by a device operatively coupled to a processor, a natural language question; and identifying, by the device, an answer for the natural language question, based on a tailored knowledge graph iteratively generated from a set of structured sub-queries associated with the natural language question.

Neither the human mind nor a human with pen and paper can electronically construct a knowledge graph by iterating through a set of structured sub-queries and can electronically leverage such knowledge graph to identify an answer to a natural language question. After all, a knowledge graph is a specific type of data structure according to which computer memories can store or access information (e.g., contrast knowledge graphs with relational tables). That is, a knowledge graph is an inherently computerized construct which neither the human mind, nor a human with pen and paper, can meaningfully implement. Likewise, a structured query or sub-query is an electronic request for information, where such electronic request is written in a machine-readable format or syntax (e.g., SQL, SPARQL). In other words, a structured query or sub-query is an inherently computerized construct which neither the human mind, nor a human with pen and paper, can meaningfully implement. Furthermore, natural language question answering is itself a technical field that focuses on enabling computers to substantively respond with semantic accuracy to textual questions. Although it may seem tautological, systems or techniques that enable computers to substantively respond with semantic accuracy to textual questions are certainly inherently computerized. Accordingly, a computerized tool that can build a knowledge graph by iterating through structured sub-queries and that can perform natural language question answering based on that knowledge graph is inherently computerized and cannot be implemented in any sensible, practicable, or reasonable way without computers.

In various instances, one or more embodiments described herein can integrate the herein-described teachings into a practical application. As mentioned above, some existing techniques for facilitating natural language question answering utilize knowledge graphs. Such existing techniques are transparent and able to handle complex reasoning. Unfortunately, however, such existing techniques can be considered as disadvantageous since they either: rely upon large, pre-curated knowledge graphs that contain much information irrelevant to a given natural language question; or rely upon manual intervention to filter out noisy, irrelevant triplets. As also mentioned above, other existing techniques for facilitating natural language question answering utilize deep learning. Such other existing techniques exhibit powerful performance. Unfortunately, though, such other existing techniques are black-boxes and have difficulty handling complex reasoning.

Various embodiments described herein can address one or more of these technical problems. In particular, various embodiments described herein can involve decomposing a natural language question into various structured sub-queries, answering such structured sub-queries via deep learning or triplet extraction, and iteratively constructing a tailored knowledge graph from the answers to those structured sub-queries. Once the tailored knowledge graph is built, it can be leveraged to identify an answer to the natural language question. Accordingly, various embodiments described herein can be considered as a hybrid technique that leverages both knowledge graphs and deep learning. Thus, such embodiments can exhibit the transparency and complex reasoning capabilities of knowledge graph question answering techniques while also exhibiting the performance boosts of deep learning question answering techniques. In other words, such embodiments can be considered as improving the transparency and complex reasoning capabilities of deep learning by leveraging knowledge graphs.

Furthermore, various embodiments described herein can be considered as building question-specific knowledge graphs that omit unnecessary or irrelevant information. Indeed, as described herein, various embodiments incrementally build a knowledge graph for a natural language question, by iterating through structured sub-queries into which the natural language question can be decomposed. This can cause the knowledge graph to contain information from an available corpus that is relevant to answering the natural language question and to omit or exclude information from the available corpus that is irrelevant to answering the natural language question. Contrast this with existing knowledge graph question answering techniques, which either: utilize voluminous, pre-curated knowledge graphs that contain much information that is not pertinent to the natural language question; or build a knowledge graph using all possible triplets that can be extracted from an available corpus and rely upon manual intervention to filter out noisy, irrelevant triplets.

Therefore, various embodiments described herein can be considered as outperforming various existing techniques for facilitating natural language question answering. For at least these reasons, various embodiments described herein certainly constitute useful and practical applications of computers.

It should be appreciated that the figures and the herein disclosure describe non-limiting examples of various embodiments. It should further be appreciated that the figures are not necessarily drawn to scale.

FIG. 1 illustrates a block diagram of an example, non-limiting system 100 that can facilitate question answering via tailored knowledge induction in accordance with one or more embodiments described herein. As shown, a tailored knowledge induction system 102 can be electronically integrated, via any suitable wired or wireless electronic connections, to a natural language question 104 and to a document corpus 106.

In various embodiments, the natural language question 104 can be any suitable electronic data that can indicate, convey, or otherwise represent any suitable string of unstructured text, where such string of unstructured text can form, amount to, or otherwise be considered as an interrogative sentence or sentence fragment. In various aspects, such string of unstructured text can exhibit any suitable length. In other words, the natural language question 104 can comprise any suitable number of words. In various instances, the natural language question 104 can be written or otherwise expressed in any suitable language. As a non-limiting example, the natural language question 104 can be written or expressed in English. In various cases, the natural language question 104 can be typed by, selected by, or otherwise provided by a user or operator interacting with any suitable human-computer-interface device (not shown). As a non-limiting example, the user or operator can type the natural language question 104 using a keyboard of a laptop computer or of a desktop computer. As another non-limiting example, the user or operator can speak a verbal question to a microphone of a smart device, and a speech-to-text converter of that smart device can transcribe the verbal question into the natural language question 104.

In various embodiments, the document corpus 106 can comprise n unstructured documents, for any suitable positive integer n: an unstructured document 106(1) to an unstructured document 106(n). In various aspects, each unstructured document of the document corpus 106 can be any suitable electronic data that can indicate, convey, or otherwise represent any suitable string of unstructured text, where such string of unstructured text can form, amount to, or otherwise be considered as one or more sentences or sentence fragments. As a non-limiting example, the unstructured document 106(1) can be a first unstructured text string having any suitable length or otherwise being made up of any suitable number of sentences or sentence fragments (e.g., can be a single sentence, can be a paragraph of sentences, or can be multiple pages of paragraphs). As another non-limiting example, the unstructured document 106(n) can be an n-th unstructured text string having any suitable length or otherwise being made up of any suitable number of sentences or sentence fragments. In various instances, different unstructured documents of the document corpus 106 can have the same or different lengths (e.g., numbers of words, numbers of sentences, numbers of paragraphs) as each other. In various cases, each unstructured document of the document corpus 106 can be written in the same language (e.g., English) as the natural language question 104. However, this is a mere non-limiting example. In other cases, different unstructured documents of the document corpus 106 can be written in the same or different languages as each other.

In any case, the document corpus 106 can be considered as a library of known information, and it can be desired to determine an answer to the natural language question 104 based on the document corpus 106. In various instances, the tailored knowledge induction system 102 can determine such answer as described herein.

In various embodiments, the tailored knowledge induction system 102 can comprise a processor 108 (e.g., computer processing unit, microprocessor) and a non-transitory computer-readable memory 110 that is operably connected or coupled to the processor 108. The memory 110 can store computer-executable instructions which, upon execution by the processor 108, can cause the processor 108 or other components of the tailored knowledge induction system 102 (e.g., access component 112, parser component 114, graph component 116, answer component 118) to perform one or more acts. In various embodiments, the memory 110 can store computer-executable components (e.g., access component 112, parser component 114, graph component 116, answer component 118), and the processor 108 can execute the computer-executable components.

In various embodiments, the tailored knowledge induction system 102 can comprise an access component 112. In various aspects, the access component 112 can electronically receive or otherwise electronically access the natural language question 104 or the document corpus 106. In various instances, the access component 112 can electronically retrieve the natural language question 104 or the document corpus 106 from any suitable centralized or decentralized data structures (not shown) or from any suitable centralized or decentralized computing devices (not shown). In any case, the access component 112 can electronically obtain or access the natural language question 104 or the document corpus 106, such that other components of the tailored knowledge induction system 102 can electronically interact with the natural language question 104 or with the document corpus 106.

In various embodiments, the tailored knowledge induction system 102 can comprise a parser component 114. In various aspects, as described herein, the parser component 114 can electronically convert the natural language question 104 into a logical query comprising a set of structured sub-queries.

In various embodiments, the tailored knowledge induction system 102 can comprise a graph component 116. In various instances, as described herein, the graph component 116 can electronically generate a tailored knowledge graph, based on the set of structured sub-queries and based on the document corpus.

In various embodiments, the tailored knowledge induction system 102 can comprise an answer component 118. In various cases, as described herein, the answer component 118 can electronically identify an answer to the natural language question 104, based on the tailored knowledge graph.

Figure 2:
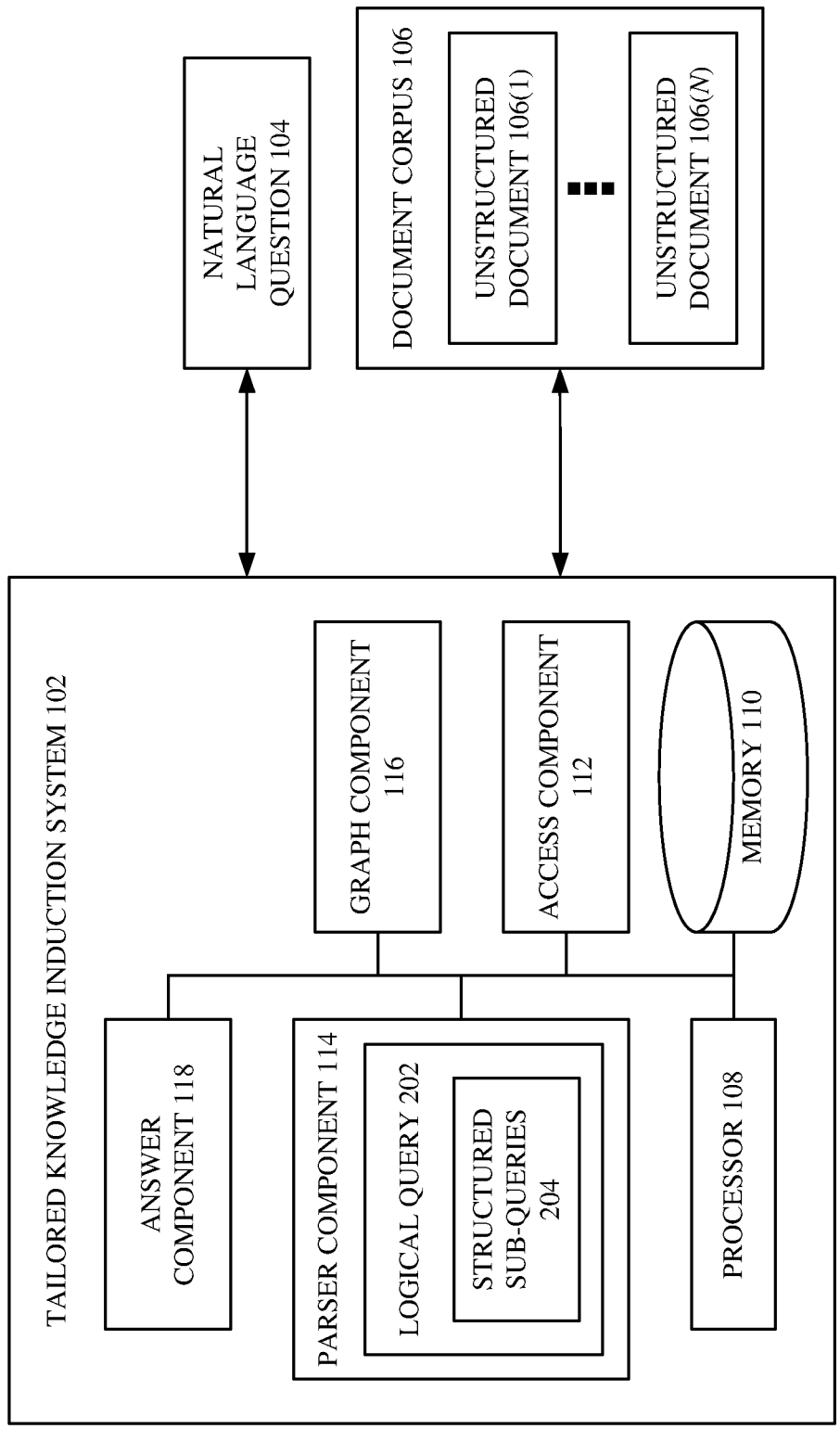
FIG. 2 illustrates a block diagram of an example, non-limiting system including a logical query comprising a set of structured sub-queries that facilitates question answering via tailored knowledge induction in accordance with one or more embodiments described herein.

FIG. 2 illustrates a block diagram of an example, non-limiting system 200 including a logical query comprising a set of structured sub-queries that can facilitate question answering via tailored knowledge induction in accordance with one or more embodiments described herein. As shown, the system 200 can, in some cases, comprise the same components as the system 100, and can further comprise a logical query 202 made up of a set of structured sub-queries 204.

In various embodiments, the parser component 114 can electronically generate the logical query 202, based on the natural language question 104. More specifically, the parser component 114 can electronically apply any suitable semantic parsing technique to the natural language question 104, and such semantic parsing can yield the logical query 202, which can comprise the set of structured sub-queries 204. Various non-limiting aspects are described with respect to FIG. 3.

Figure 3:
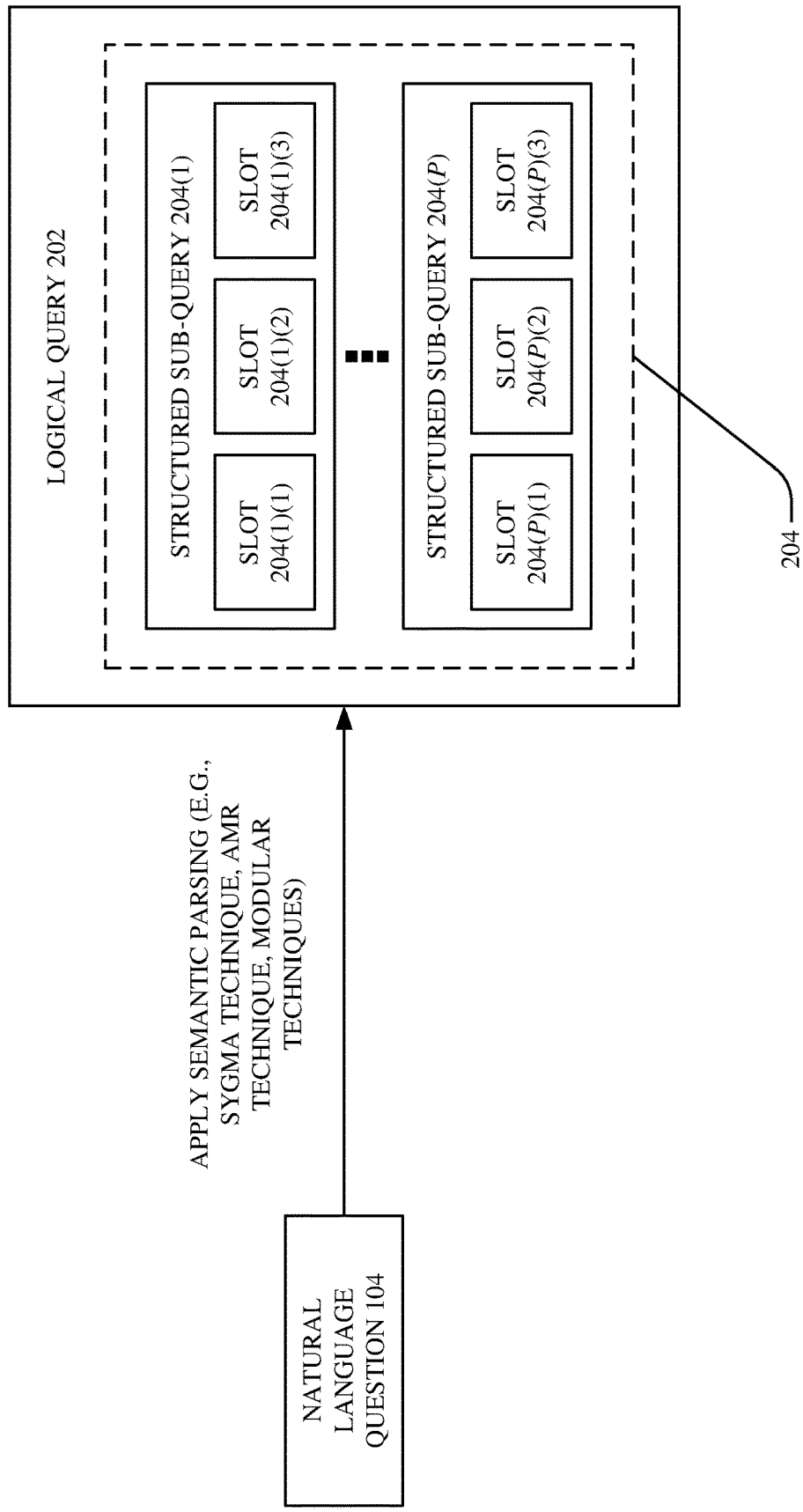
FIG. 3 illustrates an example, non-limiting block diagram showing how a natural language question can be converted into a logical query comprising a set of structured sub-queries in accordance with one or more embodiments described herein.

FIG. 3 illustrates an example, non-limiting block diagram 300 showing how the natural language question 104 can be converted into the logical query 202 in accordance with one or more embodiments described herein.

In various aspects, the parser component 114 can electronically apply any suitable semantic parsing methodology to the natural language question 104. As a non-limiting example, the parser component 114 can apply a SYGMA parsing technique to the natural language question 104. As another non-limiting example, the parser component 114 can apply an AMR parsing technique to the natural language question 104. As even another non-limiting example, the parser component 114 can apply a modular-SQL or modular-SPARQL parsing technique to the natural language question 104. In any case, application of semantic parsing to the natural language question 104 can convert or transform the natural language question 104 into the logical query 202. In various instances, the logical query 202 can be considered as being a semantically equivalent, structured version of the natural language question 104. As a non-limiting example, the logical query 202 can be considered as a SQL-version of the natural language question 104. As another non-limiting example, the logical query 202 can be considered as a SPARQL-version of the natural language question 104.

In various aspects, the logical query 202 can, as shown, comprise the set of structured sub-queries 204. In various instances, the set of structured sub-queries 204 can comprise p sub-queries, for any suitable positive integer p: a structured sub-query 204(1) to a structured sub-query 204(p). In various cases, each of the set of structured sub-queries 204 can be a semantic triplet that pertains to or otherwise captures a respective semantic portion of the natural language question 104. That is, in various aspects, each of the set of structured sub-queries 204 can comprise three parameter slots: two noun slots and a relation slot. As a non-limiting example, the structured sub-query 204(1) can comprise a slot 204(1)(1), a slot 204(1)(2), and a slot 204(1)(3). In various instances, the slot 204(1)(1) and the slot 204(1)(3) can be noun slots, and the slot 204(1)(2) can be a relation slot. As another non-limiting example, the structured sub-query 204(p) can comprise a slot 204(p)(1), a slot 204(p)(2), and a slot 204(p)(3). Just as above, the slot 204(p)(1) and the slot 204(p)(3) can be noun slots, and the slot 204(p)(2) can be a relation slot.

In some instances, for any structured sub-query in the set of structured sub-queries 204, both noun slots and the relation slot of that structured sub-query can be filled. As a non-limiting example, suppose that the slot 204(1)(1) were filled with a noun A, the slot 204(1)(2) were filled with a relationship B, and the slot 204(1)(3) were filled with a noun C. In such case, the structured sub-query 204(1) could be considered as a semantic triplet declaring that the noun A has a relationship B with the noun C.

In other instances, for any structured sub-query in the set of structured sub-queries 204, at least one of the two noun slots or the relation slot of that structured sub-query can be empty. As a non-limiting example, suppose that the slot 204(1)(1) were filled with the noun A and that the slot 204(1)(3) were filled with the noun C, and suppose that the slot 204(1)(2) were empty (e.g., filled with a variable identifier). In such case, the structured sub-query 204(1) could be considered as a semantic triplet asking what relationship exists between the noun A and the noun C. As another non-limiting example, suppose that the slot 204(1)(1) were filled with the noun A and that the slot 204(1)(2) were filled with the relationship B, and suppose that the slot 204(1)(3) were empty (e.g., filled with a variable identifier). In such case, the structured sub-query 204(1) could be considered as a semantic triplet asking what noun has the relationship B with the noun A. As yet another non-limiting example, suppose that the slot 204(1)(2) were filled with the relationship B, and suppose that the slot 204(1)(1) and the slot 204(1)(3) were empty (e.g., filled with respective variable identifiers). In such case, the structured sub-query 204(1) could be considered as a semantic triplet asking what two nouns relate to each other via the relationship B.

In various aspects, different ones of the set of structured sub-queries 204 can have different numbers or types of missing or empty slots as each other. As a non-limiting example, some of the set of structured sub-queries 204 can have one missing or empty slot, whereas others of the set of structured sub-queries 204 can have two missing or empty slots, whereas yet others of the set of structured sub-queries 204 can have three missing or empty slots. In various instances, there can be at least one structured sub-query that initially has one missing or empty slot. After all, the semantic parsing performed by the graph component 116 can fill the other two parameter slots of that at least one structured sub-query with appropriate textual information from the natural language question 104.

In various cases, two or more of the set of structured sub-queries 204 can be daisy-chained together by sharing empty parameter slots. As a non-limiting example, suppose that the slot 204(1)(1) were filled with the noun A, that the slot 204(1)(2) were filled with the relationship B, and that the slot 204(1)(3) were empty. As mentioned above, the structured sub-query 204(1) can, in such case, be considered as asking what noun has the relationship B with the noun A. Furthermore, suppose that the slot 204(p)(1) were empty, that the slot 204(p)(2) were filled with a relationship D, and that the slot 204(p)(3) were empty. In such case, the structured sub-query 204(p) can be considered as asking what two nouns are related to each other by the relationship D. Now, it can be the case that the slot 204(1)(3) and the slot 204(p)(1) are shared. In other words, it can be the case that the slot 204(1)(3) and the slot 204(p)(1) refer to the same unknown noun as each other. In such situation, the structured sub-query 204(1) and the structured sub-query 204(p) can collectively be considered as asking what first unknown noun has the relationship B with the noun A, and what second unknown noun as the relationship D with that first unknown noun. In such case, the structured sub-query 204(1) and the structured sub-query 204(p) can be considered as being chained together by that first unknown noun (e.g., by whatever noun is being referred to by both the slot 204(1)(3) and the slot 204(p)(1)). In other words, two or more of the set of structured sub-queries 204 can reference or otherwise refer to the same unknown nouns or unknown relationships (e.g., to the same unknown parameter slots) as each other.

Because each of the set of structured sub-queries 204 can be a semantic triplet, each of the set of structured sub-queries 204 can be considered as involving non-complex reasoning. That is, each of the set of structured sub-queries 204 can be considered as asking for one or two unknown nouns or for an unknown relationship, without requiring that such nouns or relationship be subsequently numerically, temporally, or taxonomically compared after identification. Despite each of the set of structured sub-queries 204 being non-complex, the logical query 202 may or may not involve complex reasoning. Indeed, although not shown in FIG. 3, the logical query 202 can, in various aspects, comprise any other suitable logical operations or mathematical operations that take as input arguments any of the various query parameter slots of the set of structured sub-queries 204. As a non-limiting example, suppose that the slot 204(1)(1) is filled with the noun A, that the slot 204(1)(2) is filled with the relationship B, and that the slot 204(1)(3) is empty. Moreover, suppose that the slot 204(p)(1) is filled with a noun F, that the slot 204(p)(2) is filled with a relationship G. and that the slot 204(p)(3) is empty. In such case, the structured sub-query 204(1) can be considered as asking what first unknown noun has the relationship B with the noun A, and the structured sub-query 204(p) can be considered as asking what second unknown noun has the relationship G with the noun F. Now, in various aspects, it can be the case that the logical query 202 has a logical or mathematical operation (not shown) that performs a numerical, temporal, or taxonomical comparison between the first unknown noun and the second unknown noun. In such situation, the logical query 202 can be considered as involving complex reasoning, notwithstanding that the structured sub-query 204(1) and the structured sub-query 204(p) do not individually involve complex reasoning.

Figure 4:
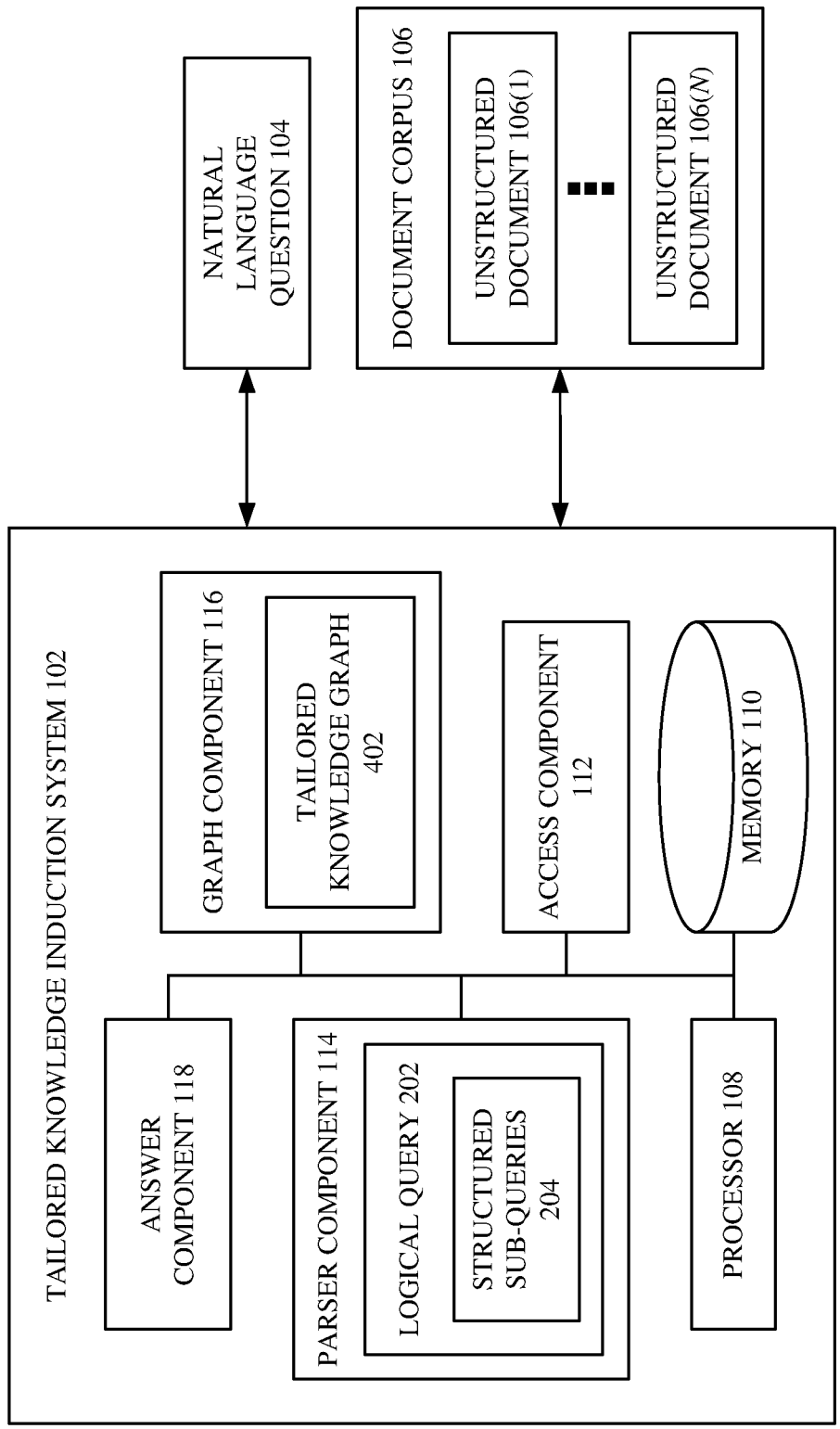
FIG. 4 illustrates a block diagram of an example, non-limiting system including a tailored knowledge graph that facilitates question answering via tailored knowledge induction in accordance with one or more embodiments described herein.

FIG. 4 illustrates a block diagram of an example, non-limiting system 400 including a tailored knowledge graph that can facilitate question answering via tailored knowledge induction in accordance with one or more embodiments described herein. As shown, the system 400 can, in some cases, comprise the same components as the system 200, and can further comprise a tailored knowledge graph 402.

In various embodiments, the graph component 116 can electronically generate the tailored knowledge graph 402, based on the document corpus 106 and based on the logical query 202. More specifically, the graph component 116 can incrementally build the tailored knowledge graph 402, by iterating through each of the set of structured sub-queries 204. Various non-limiting aspects are described with respect to FIG. 5.

Figure 5:
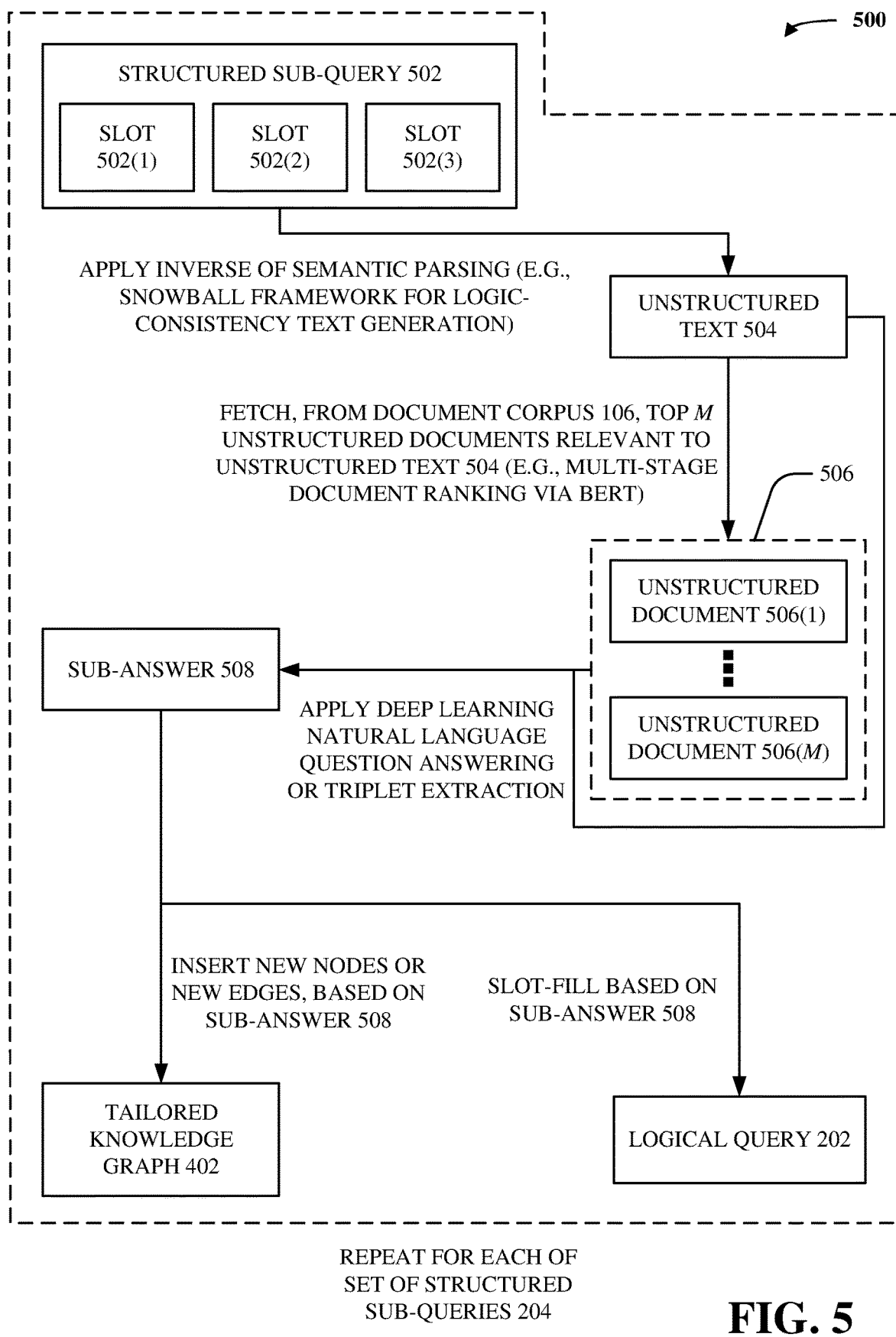
FIG. 5 illustrates an example, non-limiting block diagram showing how a tailored knowledge graph can be generated in accordance with one or more embodiments described herein.

FIG. 5 illustrates an example, non-limiting block diagram 500 showing how the tailored knowledge graph 402 can be generated in accordance with one or more embodiments described herein.

In various embodiments, the graph component 116 can initialize the tailored knowledge graph 402 to be empty. That is, the tailored knowledge graph 402 can begin as a graph data structure that has no nodes and no edges.

In various aspects, the graph component 116 can select any of the set of structured sub-queries 204. In various instances, such selected structured sub-query can be referred to as a structured sub-query 502. In various cases, as mentioned above, the structured sub-query 502 can be a semantic triplet having three parameter slots: a slot 502(1) which can be a first noun slot; a slot 502(2) which can be a relationship slot; and a slot 502(3) which can be a second noun slot. In various aspects, the graph component 116 can select from the set of structured sub-queries 204 in order of increasing number of empty or unfilled parameter slots. Moreover, as mentioned above, the set of structured sub-queries 204 can include one or more structured sub-queries that each initially have one empty parameter slot. Accordingly, the structured sub-query 502 can be one of those one or more structured sub-queries. In other words, one of the slot 502(1), the slot 502(2), and the slot 502(3) can be empty and the remaining two can be filled (e.g., if either of the slot 502(1) or the slot 502(3) is empty, then the structured sub-query 502 can be considered as asking for an unknown noun; if the slot 502(2) is empty, then the structured sub-query 502 can be considered as asking for an unknown relationship).

In various aspects, the graph component 116 can generate unstructured text 504, by applying any suitable inverse of semantic parsing to the structured sub-query 502. As a non-limiting example, the graph component 116 can apply a SNOWBALL framework for logic-consistency text generation to the structured sub-query 502, so as to obtain the unstructured text 504. In any case, the unstructured text 504 can be considered as a natural language version of the structured sub-query 502. That is, the unstructured text 504 can, in various instances, be any suitable electronic data indicating, conveying, or otherwise representing a string of unstructured text, where such string of unstructured text can form, amount to, or otherwise be considered as an interrogative sentence or sentence fragment that contain or capture the semantic meaning of the structured sub-query 502, and that does not contain or capture the semantic meaning of the remainder of the set of structured sub-queries 204. In various aspects, such string of unstructured text can exhibit any suitable length (e.g., can comprise any suitable number of words). In various instances, the unstructured text 504 can be written or otherwise expressed in the same or different language as the natural language question 104.

In various cases, the graph component 116 can fetch, from the document corpus 106 and based on the unstructured text 504, a set of unstructured documents 506. In various aspects, the set of unstructured documents 506 can be considered as a strict subset of the document corpus 106. More specifically, as shown, the set of unstructured documents 506 can comprise m documents, for any suitable positive integer m<n: an unstructured document 506(1) to an unstructured document 506($m$). In various instances, the set of unstructured documents 506 can be considered as comprising the top m documents in the document corpus 106 that are most relevant or pertinent to the unstructured text 504, and thus that are most relevant or pertinent to the structured sub-query 502. In various cases, the graph component 116 can facilitate such fetching via any suitable document fetching methodologies. As a non-limiting example, the graph component 116 can implement, with respect to the unstructured text 504, multi-stage document ranking using BERT in order to fetch the set of unstructured documents 506 from the document corpus 106.

In various aspects, the graph component 116 can generate a sub-answer 508, based on the unstructured text 504 and based on the set of unstructured documents 506. In various instances, the sub-answer 508 can be any suitable electronic data that indicates, conveys, or otherwise represents a semantic answer to the structured sub-query 502. In other words, the sub-answer 508 can be considered as a noun or a relationship that has been identified from the set of unstructured documents 506 and that can fill the empty or missing parameter slot of the structured sub-query 502.

In various cases, the graph component 116 can generate or otherwise identify the sub-answer 508 via any suitable deep learning technique. More specifically, although not shown in the figures for sake of space, the graph component 116 can electronically store, electronically maintain, electronically control, or otherwise electronically access a deep learning pipeline. In various aspects, the deep learning pipeline can have or otherwise exhibit any suitable deep learning internal architecture. For instance, the deep learning pipeline can have an input layer, one or more hidden layers, and an output layer. In various instances, any of such layers can be coupled together by any suitable interneuron connections or inter-layer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

Regardless of its internal architecture, the deep learning pipeline can, in various aspects, be configured to perform natural language question answering on inputted texts and corpora. Accordingly, in various instances, the graph component 116 can execute the deep learning pipeline on the unstructured text 504 and on the set of unstructured documents 506, which can cause the deep learning pipeline to produce as output the sub-answer 508. In particular, the graph component 116 can, in various cases, feed both the unstructured text 504 and the set of unstructured documents 506 to the input layer of the deep learning pipeline. In various aspects, both the unstructured text 504 and the set of unstructured documents 506 can complete a forward pass through the one or more hidden layers of the deep learning pipeline. In various instances, the output layer of the deep learning pipeline can compute or otherwise calculate the sub-answer 508, based on activation maps generated by the one or more hidden layers of the deep learning pipeline.

In some cases, the fetching technique (e.g., multi-stage document ranking via BERT) implemented by the graph component 116 can be considered as being an upstream portion of the deep learning pipeline.

In any case, for the sub-answer 508 to be accurate, the deep learning pipeline can first undergo training. Indeed, in various aspects, the deep learning pipeline can be or can have been trained to perform natural language question answering via any suitable training paradigm. As a non-limiting example, the deep learning pipeline can be or can have been trained in supervised fashion using annotated training data (e.g., training data for which ground-truths are known). As another non-limiting example, the deep learning pipeline can be or can have been trained in unsupervised fashion using unannotated training data (e.g., training data for which ground-truths are not known). As yet another non-limiting example, the deep learning pipeline can be or can have been trained in reinforcement learning fashion using any suitable reinforcement learning reward functions or punishment functions and update policies. Moreover, the deep learning pipeline can be or can have been trained according to any suitable training hyperparameters. As a non-limit example, the deep learning pipeline can be or can have been trained via any suitable backpropagation technique, such as stochastic gradient descent. As another non-limiting example, the deep learning pipeline can be or can have been trained via any suitable loss or objective function, such as MAE, MSE, or cross-entropy. As even another non-limiting example, the deep learning pipeline can be or can have been trained via any suitable training termination criterion, such as a percent change loss threshold or a maximum number of training epochs. As yet another non-limiting example, the deep learning pipeline can be or can have been trained via any suitable training batch sizes. In any case, the deep learning pipeline can have any suitable trainable internal parameters (e.g., weight matrices, bias values, convolutional kernels), and such trainable internal parameters can be or can have been iteratively or incrementally updated via training to accurately or precisely perform natural language question answering.

As described herein, the graph component 116 can generate or identify the sub-answer 508 via deep learning. However, this is a mere non-limiting example. In various embodiments, the graph component 116 can instead identify the sub-answer 508 by applying any suitable semantic triplet extraction techniques to the set of unstructured documents 506.

In various aspects, the graph component 116 can perform slot-filling on the logical query 202, based on the sub-answer 508. In particular, as mentioned above, the structured sub-query 502 can be a triplet that has one missing or empty parameter slot (e.g., one of the slot 502(1), the slot 502(2), or the slot 502(3) can be empty). In various instances, the sub-answer 508 can be considered as textual content that the deep learning pipeline has determined can or should fill that missing or empty parameter slot. As a non-limiting example, if one of the slot 502(1) or the slot 502(3) is empty, then the sub-answer 508 can be a noun that was identified in the set of unstructured documents 506 and that can fill that empty or missing parameter slot. As another non-limiting example, if the slot 502(2) is empty, then the sub-answer 508 can be a relationship that was identified in the set of unstructured documents 506 and that can fill that empty or missing parameter slot. In any case, the graph component 116 can fill that empty or missing parameter slot of the structured sub-query 502 with the sub-answer 508 (e.g., the graph component 116 can insert the sub-answer 508 into the missing or empty parameter slot of the structured sub-query 502). Moreover, as mentioned above, that empty or missing parameter slot might be referenced, shared, or otherwise contained in other portions of the logical query 202. As a non-limiting example, whatever noun or relationship was referenced by the empty or missing parameter slot of the structured sub-query 502 can be present in others of the set of structured sub-queries 204 (e.g., various structured sub-queries can be daisy-chained together). As another non-limiting example, whatever noun or relationship was referenced by the empty or missing parameter slot of the structured sub-query 502 can be taken as an input argument for a logical or mathematical operator that is implemented elsewhere in the logical query 202 (e.g., the logical query 202 can involve complex reasoning). In any case, the graph component 116 can fill with the sub-answer 508 whatever other empty or missing parameter slots that are present within the logical query 202 and that reference the same noun or relationship as the empty or missing parameter slot of the structured sub-query 502.

In various aspects, the graph component 116 can update the tailored knowledge graph 402, based on the sub-answer 508. More specifically, the graph component 116 can insert into the tailored knowledge graph 402 one or more new nodes or one or more new edges, according to the structured sub-query 502 as filled with the sub-answer 508. Indeed, due to slot-filling, the sub-answer 508 can be considered as completing the structured sub-query 502, such that the structured sub-query 502 can now be considered as a fully filled triplet indicating an identified relationship between two identified nouns. Thus, in various cases, the graph component 116 can check whether the tailored knowledge graph 402 already has two nodes and an edge that respectively correspond to those two identified nouns and the identified relationship. If an identified noun in the now-filled structured sub-query 502 is not represented by a distinct, corresponding node in the tailored knowledge graph 402, the graph component 116 can insert such a node (e.g., a new node) into the tailored knowledge graph 402. Similarly, if the identified relation in the now-filled structured sub-query 502 is not represented by a distinct, corresponding edge between appropriate nodes in the tailored knowledge graph 402, the graph component 116 can insert such an edge (e.g., a new edge) into the tailored knowledge graph 402. In this way, the information contained within or otherwise represented by the tailored knowledge graph 402 can incrementally grow, based on the structured sub-query 502 as slot-filled by the sub-answer 508.

In various aspects, as shown, the graph component 116 can repeat such procedure (e.g., selection, conversion, fetching, answer generation, slot-filling, graph updating) for each of the set of structured sub-queries 204. In various instances, such repetition can cause all empty or missing parameter slots within the logical query 202 to eventually become filled. In fact, note that such repeated slot-filling can cause there to always be at least one structured sub-query that has one missing or empty parameter slot (e.g., as opposed to two or three missing or empty parameter slots), until all missing or empty slot queries have been filled. After all, if any particular structured sub-query has two or three empty or missing parameter slots, such particular structured sub-query can directly or indirectly be daisy-chained with one or more other structured sub-queries that have merely one missing or empty parameter slot. As mentioned above, the graph component 116 can iterate in order of increasing number of missing or empty parameter slots. Thus, the graph component 116 can iterate to that particular structured sub-query after already having iterated to those one or more other structured sub-queries, and the slot-filling associated with those one or more other structured sub-queries can cause that particular structured sub-query to have merely one (or even zero) missing or empty parameter slots by the time its iteration turn arrives.

Note that, in various aspects, it is possible that the graph component 116 can, at some point in time, iterate to a structured sub-query that has no missing or empty parameter slots (e.g., the structured sub-query 502 can be fully filled upon being selected by the graph component 116). In such case, the graph component 116 can perform at least some of the above-described iterative procedure, in order to determine whether that fully filled structured sub-query is valid. That is, the graph component 116 can convert that fully filled structured sub-query into unstructured text, fetch relevant documents from the document corpus 106, and determine (via deep learning or triplet extraction) whether that fully filled structured sub-query is consistent with the fetched documents. If so (e.g., if that fully filled structured sub-query is consistent with the fetched documents), the graph component 116 can update the tailored knowledge graph 402 according to that fully filled structured sub-query and can iterate to a next structured sub-query. If not (e.g., if that fully filled structured sub-query is inconsistent with the fetched documents), the graph component 116 can take any suitable action (e.g., can raise an alert or warning, can edit the tailored knowledge graph 402 to be consistent with the fetched documents instead of with that fully filled structured sub-query, or can edit that fully filled structured sub-query to be consistent with the fetched documents).

In any case, the tailored knowledge graph 402 can be considered as being complete or finished when the graph component 116 has iterated through each of the set of structured sub-queries 204. In various aspects, the iterative procedure illustrated by and described with respect to FIG. 5 can cause the tailored knowledge graph 402 to contain whatever information (e.g., whatever triplets) within the document corpus 106 that is relevant to answering the natural language question 104 and to exclude whatever information (e.g., whatever triplets) within the document corpus 106 that is irrelevant to answering the natural language question 104.

Figure 6:
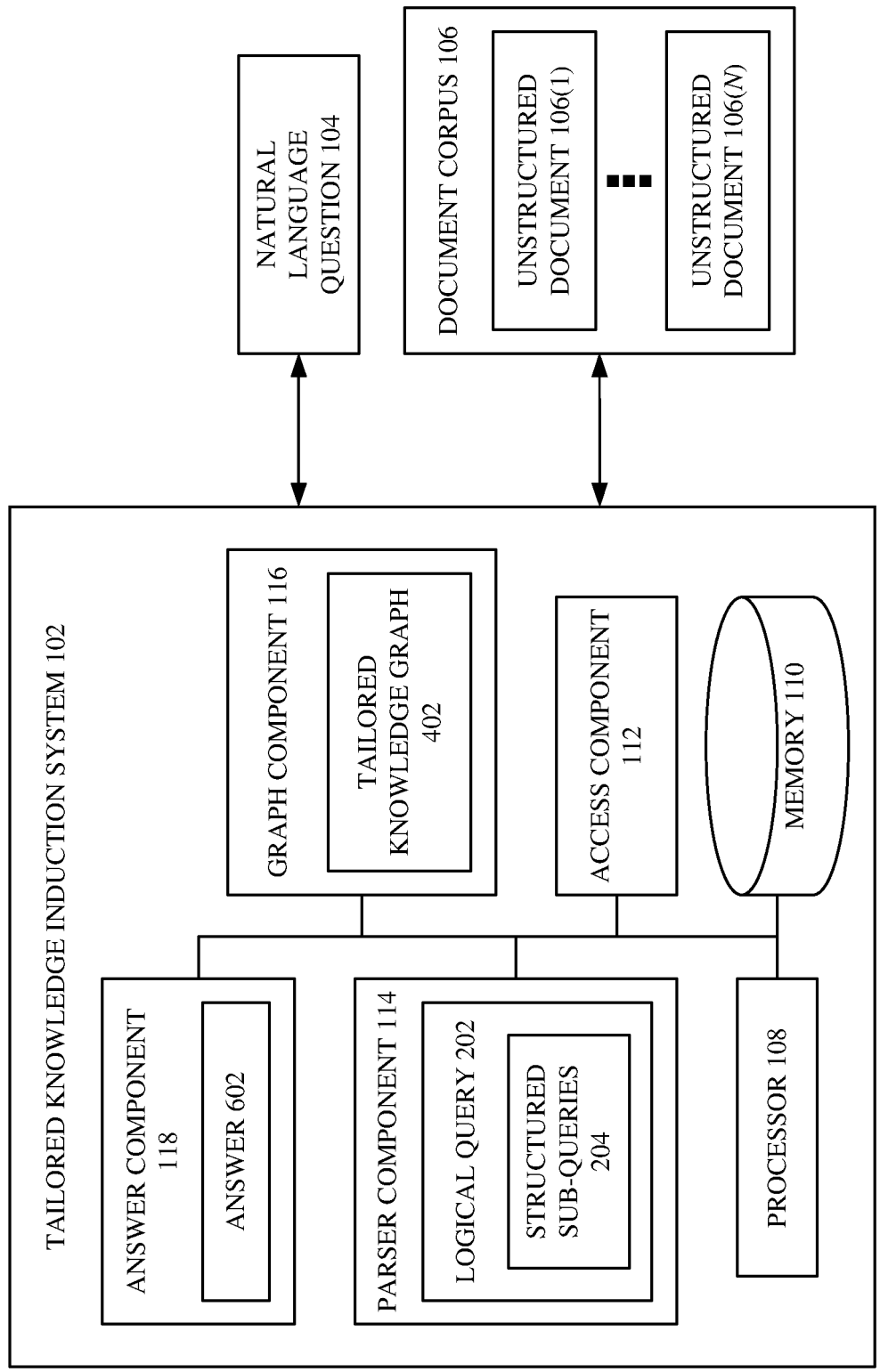
FIG. 6 illustrates a block diagram of an example, non-limiting system including an answer that facilitates question answering via tailored knowledge induction in accordance with one or more embodiments described herein.

FIG. 6 illustrates a block diagram of an example, non-limiting system 600 including an answer that can facilitate question answering via tailored knowledge induction in accordance with one or more embodiments described herein. As shown, the system 600 can, in some cases, comprise the same components as the system 400, and can further comprise an answer 602.

In various embodiments, the answer component 118 can electronically generate or electronically identify the answer 602, by executing the logical query 202 over or on the tailored knowledge graph 402. In various aspects, such execution can be facilitated in any suitable knowledge graph question answering fashion. As a non-limiting example, such execution can be facilitated in STARDOG® fashion. As another non-limiting example, such execution can be facilitated in BLAZEGRAPH® fashion. In any case, the answer 602 can be any suitable electronic data indicating or representing a text string (e.g., one or more words, sentences, or sentence fragments) that can be considered as a semantic or substantive response to the natural language question 104. In some instances, the answer component 118 can electronically render the answer 602 on any suitable electronic display (e.g., on any suitable computer screen or computer monitor). In other instances, the answer component 118 can electronically transmit the answer 602 to any suitable computing device (not shown). Accordingly, a user or operator who created or asked the natural language question 104 can become apprised of the answer 602.

Figure 7:
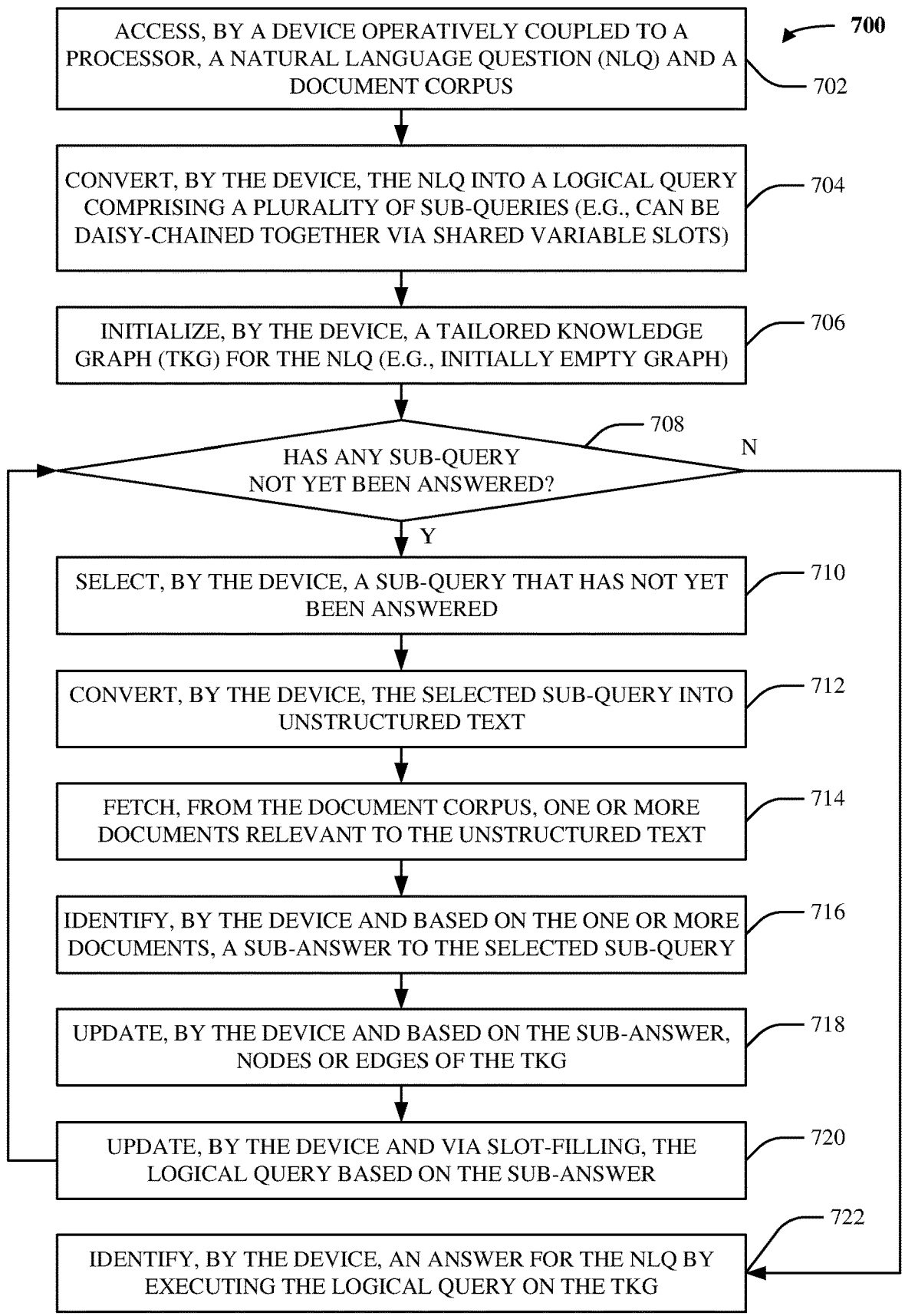
FIG. 7 illustrates a flow diagram of an example, non-limiting computer-implemented method that facilitates question answering via tailored knowledge induction in accordance with one or more embodiments described herein.

FIG. 7 illustrates a flow diagram of an example, non-limiting computer-implemented method 700 that can facilitate question answering via tailored knowledge induction in accordance with one or more embodiments described herein. In various cases, the tailored knowledge induction system 102 can facilitate the computer-implemented method 700.

In various embodiments, act 702 can include accessing, by a device (e.g., via 112) operatively coupled to a processor (e.g., 108), a natural language question (e.g., 104) and a document corpus (e.g., 106).

In various aspects, act 704 can include converting, by the device (e.g., via 114), the natural language question into a logical query (e.g., 202) comprising a plurality of sub-queries (e.g., 204). In various cases, such sub-queries can be daisy-chained or linked together via shared variable parameter slots.

In various instances, act 706 can include initializing, by the device (e.g., via 116), a tailored knowledge graph (e.g., 402) for the natural language question. In various cases, the tailored knowledge graph can be initially empty.

In various aspects, act 708 can include determining, by the device (e.g., via 116), whether any sub-query has not yet been answered. If so, the computer-implemented method 700 can proceed to act 710. If not, the computer-implemented method 700 can instead proceed to act 722.

In various instances, act 710 can include selecting, by the device (e.g., via 116), a sub-query (e.g., 502) that has not yet been answered (e.g., can be selected in order of increasing number of empty or unfilled parameter slots).

In various cases, act 712 can include converting, by the device (e.g., via 116), the selected sub-query into unstructured text (e.g., 504).

In various aspects, act 714 can include fetching, by the device (e.g., via 116) and from the document corpus, one or more documents (e.g., 506) that are relevant to the unstructured text.

In various instances, act 716 can include identifying, by the device (e.g., via 116) and based on the one or more documents, a sub-answer (e.g., 508) to the selected sub-query.

In various cases, act 718 can include updating, by the device (e.g., via 116) and based on the sub-answer, nodes or edges of the tailored knowledge graph.

In various aspects, act 720 can include updating, by the device (e.g., via 116) and via slot-filling, the logical query based on the sub-answer. In various cases, the computer-implemented method 700 can proceed back to act 708.

In various instances, act 722 can include identifying, by the device (e.g., via 118), an answer (e.g., 602) for the natural language question by executing the logical query on the tailored knowledge graph.

FIGS. 8-11 illustrate non-limiting examples showing how various aspects can be applied to real-world natural language questions in accordance with one or more embodiments described herein.

Figure 9:
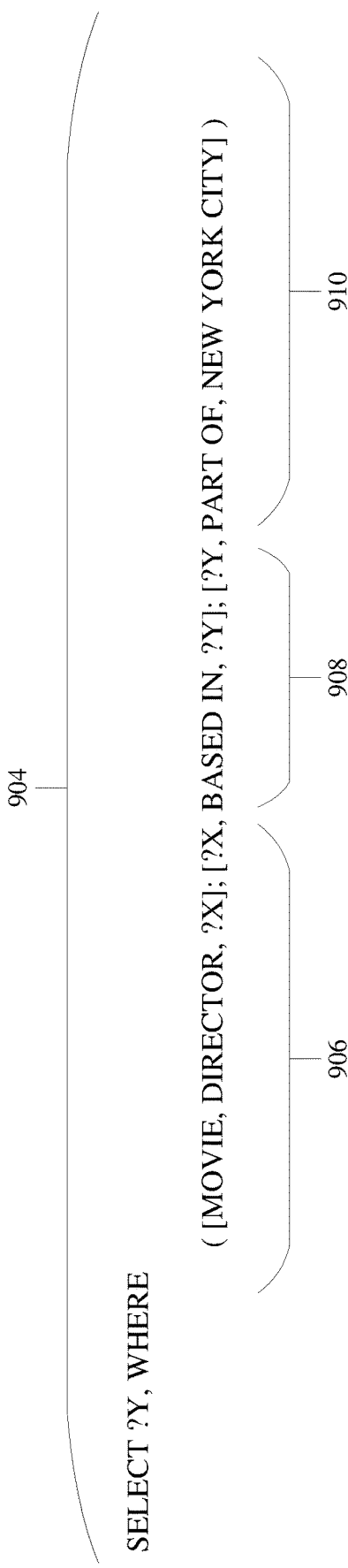

First, consider FIGS. 8-9. As shown, FIG. 8 depicts non-limiting examples of unstructured documents that can pertain to various screenwriters/directors. For instance, an unstructured document 802, an unstructured document 804, and an unstructured document 806 can pertain to a film entitled "MOVIE". As another instance, an unstructured document 808 and an unstructured document 810 can pertain to a film director named "PERSON-A", who directed "MOVIE".

Now, consider FIG. 9. As shown, there can be a natural language question 902 pertaining to "MOVIE". In various aspects, semantic parsing can be performed on the natural language question 902, thereby yielding a logical query 904. In this non-limiting example, the logical query 904 includes three sub-queries: a sub-query 906, a sub-query 908, and a sub-query 910. The sub-query 906 can have a variable parameter slot denoted by "?X" and can be considered as asking what unknown entity is the director of "MOVIE". Moreover, the sub-query 908 can have "?X", can also have another variable parameter slot denoted by "?Y", and can be considered as asking in what unknown location that unknown entity is based. Furthermore, the sub-query 910 can have "?Y" and can be considered as asking whether (or declaring that) such unknown location is part of "New York City".

In various aspects, the tailored knowledge graph 402 for the natural language question 902 can be initially empty, and the graph component 116 can iterate through the three sub-queries of the logical query 904.

For example, the sub-query 906 can be considered first. As described above, the graph component 116 can convert the sub-query 906 to unstructured text, can fetch relevant documents (e.g., 802, 804, 806) for that unstructured text, and can determine via deep learning or triplet extraction that "?X" is "PERSON-A". Accordingly, the graph component 116 can slot-fill the logical query 904 by replacing "?X: with "PERSON-A" throughout. The graph component 116 can then insert into the tailored knowledge graph 402 a node representing "MOVIE", a node representing "PERSON-A", and an edge between those two nodes indicating a "director" relationship.

The sub-query 908 can then be considered. After slot-filling of "?X", the sub-query 908 can have one variable parameter slot: "?Y". Again, as described above, the graph component 116 can convert the sub-query 908 to unstructured text, can fetch relevant documents (e.g., 808, 810) for that unstructured text, and can determine via deep learning or triplet extraction that "?Y" is "Greenwich Village". Accordingly, the graph component 116 can slot-fill the logical query 904 by replacing "?Y" with "Greenwich Village" throughout. The graph component 116 can then insert into the tailored knowledge graph 402 a node representing "Greenwich Village" and an edge between that node and the "PERSON-A" node indicating a "based in" relationship.

The sub-query 910 can then be considered. After slot-filling of "?X" and "?Y", the sub-query 910 can have zero variable parameter slots. Accordingly, the sub-query 910 can be considered as having already been answered and as declaring that the "Greenwich Village" is part of "New York City". So, the graph component 116 can insert into the tailored knowledge graph 402 a node representing "New York City" and an edge between that node and the "Greenwich Village" node indicating a "part of" relationship.

At such point, the logical query 904 can be filled, and so the answer component 118 can execute it over the tailored knowledge graph 402 to obtain the answer 602. In this non-limiting example, the answer 602 would be "Greenwich Village".

Figure 11:
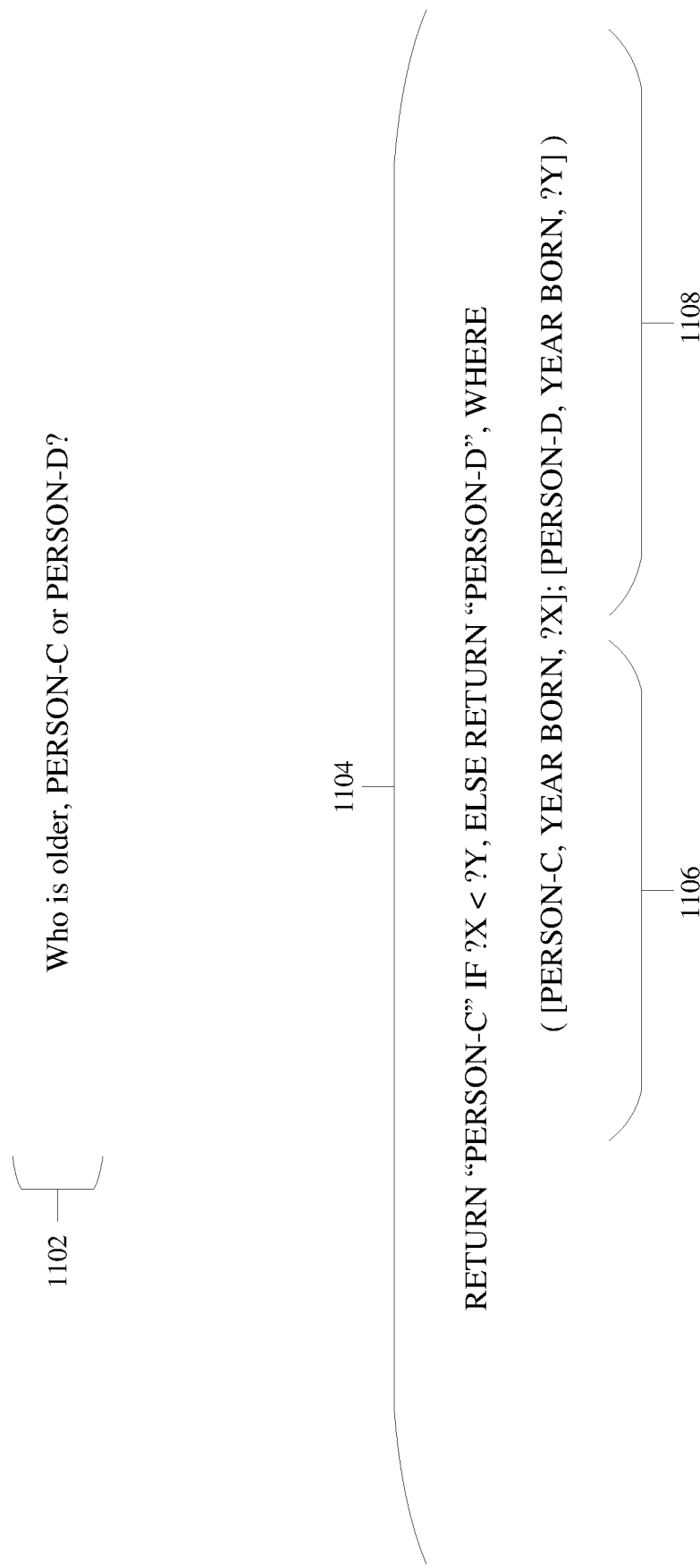

Now, consider FIGS. 10-11. As shown, FIG. 10 depicts non-limiting examples of unstructured documents that can pertain to various people. For instance, an unstructured document 1002, an unstructured document 1004, and an unstructured document 1006 can pertain to a magazine model named "PERSON-C". As another instance, an unstructured document 1008 and an unstructured document 1010 can pertain to a fashion photographer named "PERSON-D".

Now, consider FIG. 11. As shown, there can be a natural language question 1102 pertaining to both "PERSON-C" and "PERSON-D". In various aspects, semantic parsing can be performed on the natural language question 1102, thereby yielding a logical query 1104. In this non-limiting example, the logical query 1104 includes two sub-queries: a sub-query 1106 and a sub-query 1108. The sub-query 1106 can have a variable parameter slot denoted by "?X" and can be considered as asking in what unknown year "PERSON-C" was born. Moreover, the sub-query 1108 can have another variable parameter slot denoted by "?Y", and can be considered as asking in what unknown year "PERSON-D" was born. Furthermore, note that the logical query 1104 can involve complex reasoning (e.g., not only do the birth years of PERSON-C and PERSON-D have to be identified, but those birth years then have to be arithmetically compared to each other).

In various aspects, the tailored knowledge graph 402 for the natural language question 1102 can be initially empty, and the graph component 116 can iterate through the two sub-queries of the logical query 1104.

For example, the sub-query 1106 can be considered first. As described above, the graph component 116 can convert the sub-query 1106 to unstructured text, can fetch relevant documents (e.g., 1002, 1004, 1006) for that unstructured text, and can determine via deep learning or triplet extraction that "?X" is answered by "1970". Accordingly, the graph component 116 can slot-fill the logical query 1104 by replacing "?X" with "1970" throughout. The graph component 116 can then insert into the tailored knowledge graph 402 a node representing "1970", a node representing "PERSON-C", and an edge between those two nodes indicating a "born in" relationship.

The sub-query 1108 can then be considered. Again, as described above, the graph component 116 can convert the sub-query 1108 to unstructured text, can fetch relevant documents (e.g., 1008, 1010) for that unstructured text, and can determine via deep learning or triplet extraction that "?Y" is answered by "1965". Accordingly, the graph component 116 can slot-fill the logical query 1104 by replacing "?Y" with "1965" throughout. The graph component 116 can then insert into the tailored knowledge graph 402 a node representing "PERSON-D", a node representing "1965", and an edge between those two nodes indicating a "born in" relationship.

At such point, the logical query 1104 can be filled, and so the answer component 118 can execute it over the tailored knowledge graph 402 to obtain the answer 602. In this non-limiting example, the answer 602 would be "PERSON-D".

Figure 12:
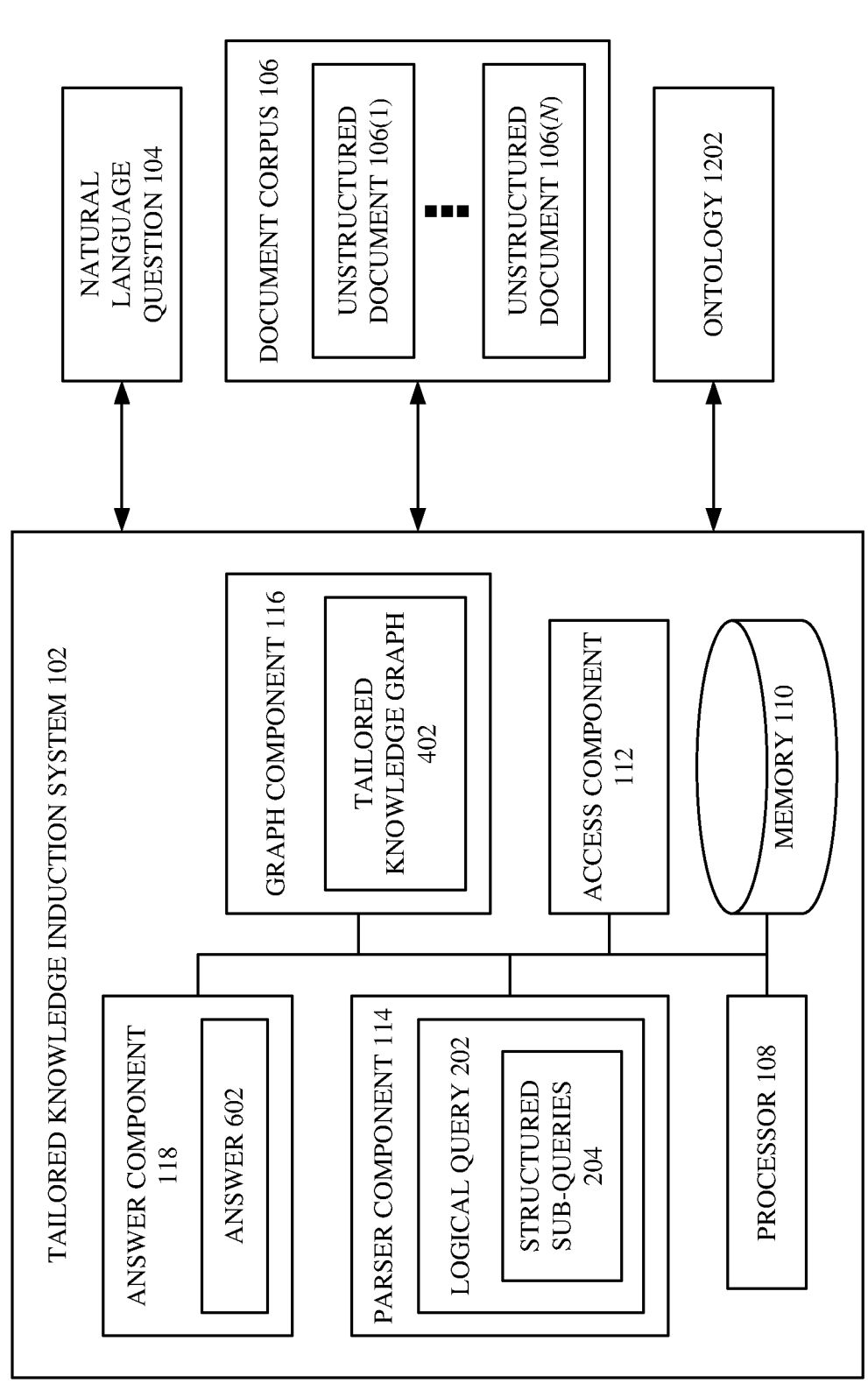
FIG. 12 illustrates a block diagram of an example, non-limiting system including an ontology that facilitates question answering via tailored knowledge induction in accordance with one or more embodiments described herein.

FIG. 12 illustrates a block diagram of an example, non-limiting system 1200 including an ontology that can facilitate question answering via tailored knowledge induction in accordance with one or more embodiments described herein. As shown, the system 1200 can, in some cases, comprise the same components as the system 600, and can further comprise an ontology 1202.

In various embodiments, the access component 112 can electronically receive, retrieve, or otherwise access the ontology 1202. In various aspects, the ontology 1202 can be any suitable knowledge graph that is premade or otherwise preformulated. In various instances, the ontology 1202 can be considered as representing any general knowledge or information about the world which may be too generic, off-topic, or often assumed to be explicitly explained within the document corpus 106. In other words, the ontology 1202 can describe, convey, or otherwise represent generally-known numerical, temporal, or taxonomical relationships between generally known things. In various aspects, the answer component 118 can leverage the ontology 1202 to help identify the answer 602. That is, the ontology 1202 and the tailored knowledge graph 402 can collectively be considered as forming a larger, aggregated knowledge graph, and the answer component 118 can identify the answer 602 by executing the logical query 202 over or on such larger, aggregated knowledge graph.

As a non-limiting example, suppose that the natural language question 104 asks which animal has more limbs: a spider, or a chicken. In such case, the document corpus can include a document that states that a spider has eight legs and another document that states that a chicken has two legs and two wings. However, the document corpus might not have any documents that explicitly state the generic taxonomical fact that spiders and chickens are both animals or that explicitly state the generic taxonomical fact that legs and wings each count as limbs. However, such generic taxonomical information can be present within the ontology 1202. In this way, the ontology 1202 can be considered as providing high-level, generally-known, or generally-assumed knowledge that might be helpful for answering the natural language question 104 but that might not be explicitly stated in the document corpus 106.

Figure 13:
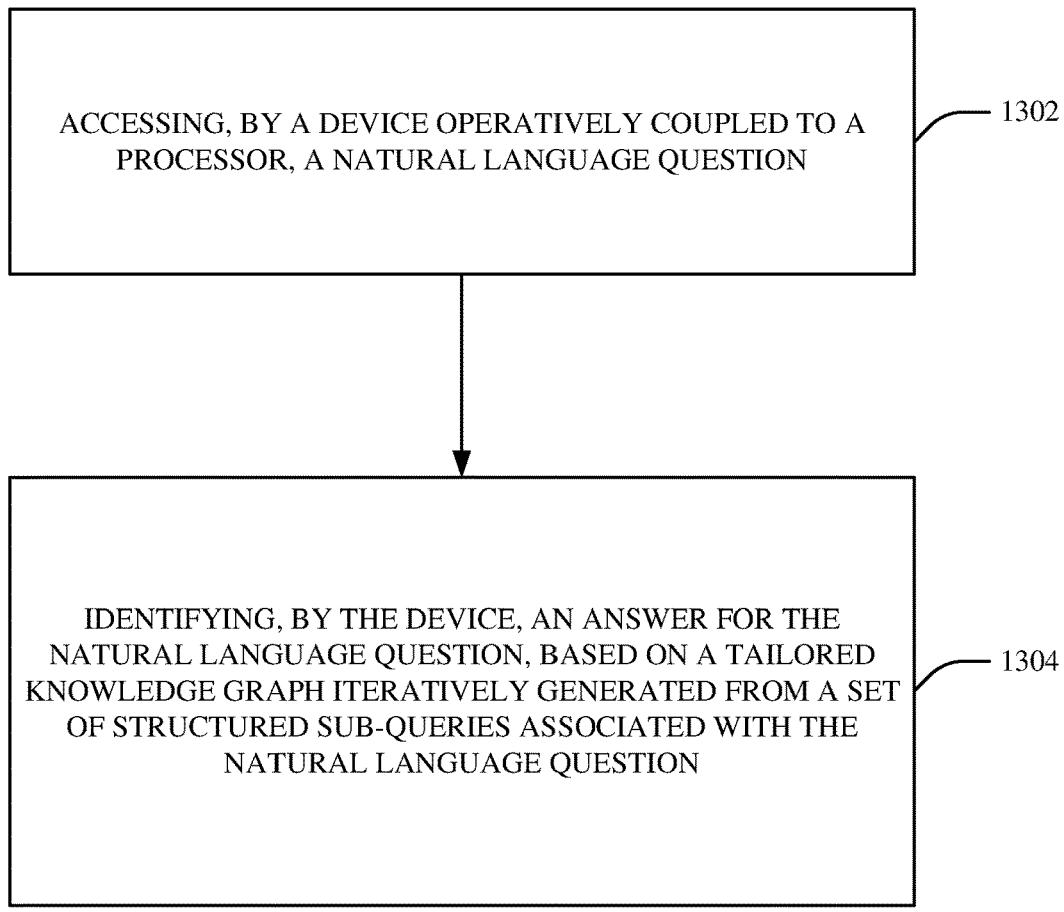
FIG. 13 illustrates a flow diagram of an example, non-limiting computer-implemented method that facilitates question answering via tailored knowledge induction in accordance with one or more embodiments described herein.

FIG. 13 illustrates a flow diagram of an example, non-limiting computer-implemented method 1300 that can facilitate question answering via tailored knowledge induction in accordance with one or more embodiments described herein. In various cases, the tailored knowledge induction system 102 can facilitate the computer-implemented method 1300.

In various embodiments, act 1302 can include accessing, by a device (e.g., via 112) operatively coupled to a processor (e.g., 108), a natural language question (e.g., 104).

In various aspects, act 1304 can include identifying, by the device (e.g., via 118), an answer (e.g., 602) for the natural language question, based on a tailored knowledge graph (e.g., 402) iteratively generated from a set of structured sub-queries (e.g., 204) associated with the natural language question.

Although not explicitly shown in FIG. 13, the computer-implemented method 1300 can comprise: converting, by the device (e.g., via 114) and via semantic parsing, the natural language question into a logical query (e.g., 202) comprising the set of structured sub-queries.

Although not explicitly shown in FIG. 13, the computer-implemented method 1300 can comprise: converting, by the device (e.g., via 116) and via an inverse of semantic parsing, a first structured sub-query (e.g., 502) from the set of structured sub-queries into first unstructured text (e.g., 504); and fetching, by the device (e.g., via 116) and from a document corpus (e.g., 106), one or more first unstructured documents (e.g., 506) corresponding to the first unstructured text.

Although not explicitly shown in FIG. 13, the computer-implemented method 1300 can comprise: generating, by the device (e.g., via 116) and via deep learning or triplet extraction, a first sub-answer (e.g., 508) for the first structured sub-query, based on the one or more first unstructured documents.

Although not explicitly shown in FIG. 13, the computer-implemented method 1300 can comprise: inserting, by the device (e.g., via 116) and based on the first sub-answer, nodes or edges into the tailored knowledge graph.

Although not explicitly shown in FIG. 13, the computer-implemented method 1300 can comprise: updating, by the device (e.g., via 116) and via slot-filling, the logical query based on the tailored knowledge graph; and converting, by the device (e.g., via 116) and via the inverse of semantic parsing, a second structured sub-query (e.g., another instance of 502) from the set of structured sub-queries into second unstructured text (e.g., another instance of 504).

Although not explicitly shown in FIG. 13, the device can generate the answer based at least in part on an ontology (e.g., 1202) associated with the natural language question.

Figure 14:
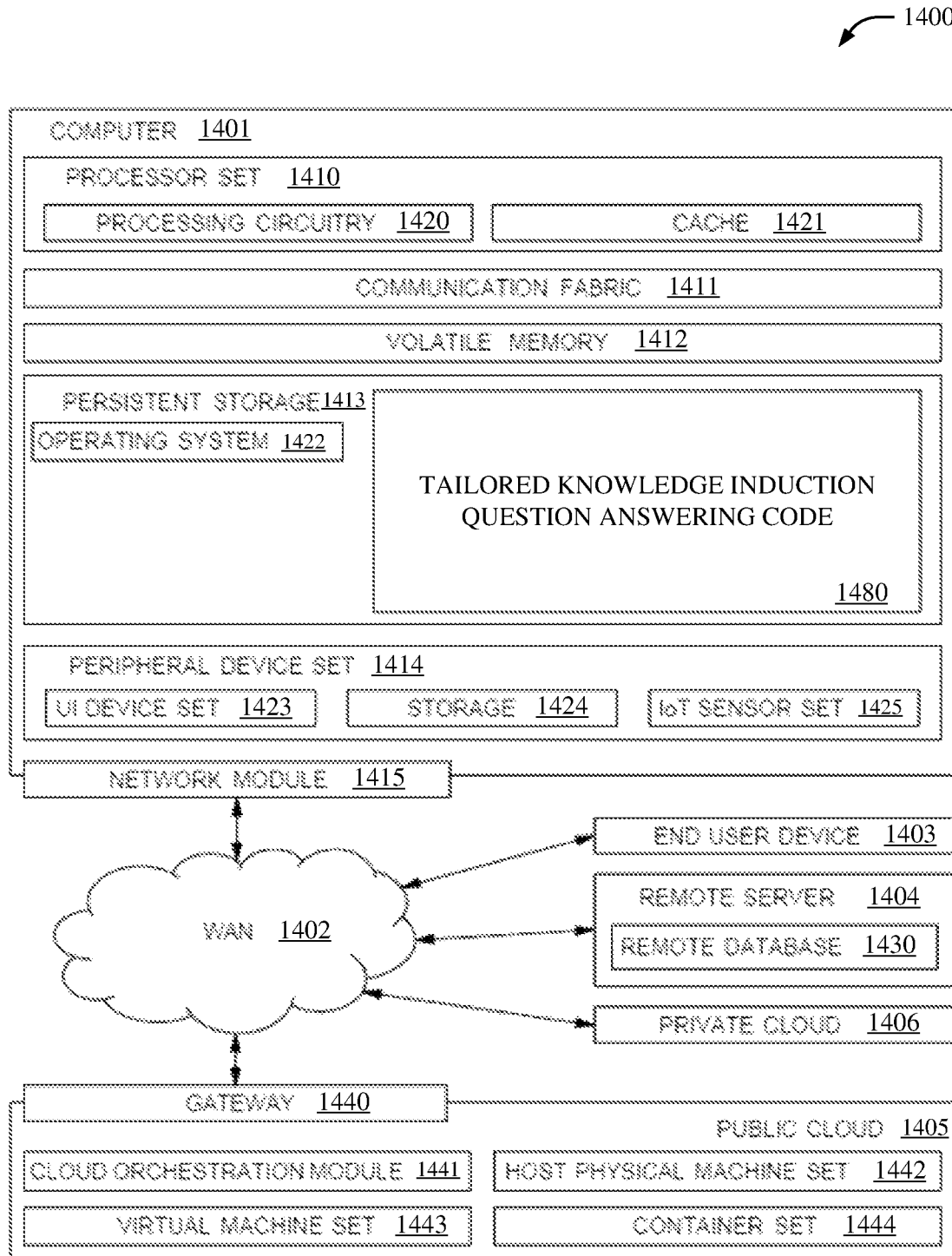
FIG. 14 illustrates a block diagram of an example, non-limiting operating environment in which one or more embodiments described herein can be facilitated.

FIG. 14 and the following discussion are intended to provide a brief, general description of a suitable computing environment 1400 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1400 contains an example of an environment for the execution of at least some of the computer code involved in performing the inventive methods, such as tailored knowledge induction question answering code 1480. In addition to block 1480, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1480, as identified above), peripheral device set 1414 (including user interface (UI), device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method can be distributed among multiple computers or between multiple locations. On the other hand, in this presentation of computing environment 1400, detailed discussion is focused on a single computer, specifically computer 1401, to keep the presentation as simple as possible. Computer 1401 can be located in a cloud, even though it is not shown in a cloud in FIG. 14. On the other hand, computer 1401 is not required to be in a cloud except to any extent as can be affirmatively indicated.

PROCESSOR SET 1410 includes one, or more, computer processors of any type now known or to be developed in the future. Processing circuitry 1420 can be distributed over multiple packages, for example, multiple, coordinated integrated circuit chips. Processing circuitry 1420 can implement multiple processor threads or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set can be located "off chip." In some computing environments, processor set 1410 can be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods can be stored in block 1480 in persistent storage 1413.

COMMUNICATION FABRIC 1411 is the signal conduction path that allows the various components of computer 1401 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths or wireless communication paths.

VOLATILE MEMORY 1412 is any type of volatile memory now known or to be developed in the future. Examples include dynamic type random access memory (RAM) or static type RAM. Typically, the volatile memory is characterized by random access, but this is not required unless affirmatively indicated. In computer 1401, the volatile memory 1412 is located in a single package and is internal to computer 1401, but, alternatively or additionally, the volatile memory can be distributed over multiple packages or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 or directly to persistent storage 1413. Persistent storage 1413 can be a read only memory (ROM), but typically at least a portion of the persistent storage allows writing of data, deletion of data and re-writing of data. Some familiar forms of persistent storage include magnetic disks and solid-state storage devices. Operating system 1422 can take several forms, such as various known proprietary operating systems or open-source Portable Operating System Interface type operating systems that employ a kernel. The code included in block 1480 typically includes at least some of the computer code involved in performing the inventive methods.

PERIPHERAL DEVICE SET 1414 includes the set of peripheral devices of computer 1401. Data communication connections between the peripheral devices and the other components of computer 1401 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1423 can include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 can be persistent or volatile. In some embodiments, storage 1424 can take the form of a quantum computing storage device for storing data in the form of qubits. In embodiments where computer 1401 is required to have a large amount of storage (for example, where computer 1401 locally stores and manages a large database) then this storage can be provided by peripheral storage devices designed for storing large amounts of data, such as a storage area network (SAN) that is shared by multiple, geographically distributed computers. IoT sensor set 1425 is made up of sensors that can be used in Internet of Things applications. For example, one sensor can be a thermometer and another sensor can be a motion detector.

NETWORK MODULE 1415 is the collection of computer software, hardware, and firmware that allows computer 1401 to communicate with other computers through WAN 1402. Network module 1415 can include hardware, such as modems or Wi-Fi signal transceivers, software for packetizing or de-packetizing data for communication network transmission, or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401) and can take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 can be a client device, such as thin client, heavy client, mainframe computer or desktop computer.

REMOTE SERVER 1404 is any computer system that serves at least some data or functionality to computer 1401. Remote server 1404 can be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data can be provided to computer 1401 from remote database 1430 of remote server 1404.

PUBLIC CLOUD 1405 is any computer system available for use by multiple entities that provides on-demand availability of computer system resources or other computer capabilities, especially data storage (cloud storage) and computing power, without direct active management by the scale. The direct and active management of the computing resources of public cloud 1405 is performed by the computer hardware or software of cloud orchestration module 1441. The computing resources provided by public cloud 1405 are typically implemented by virtual computing environments that run on various computers making up the computers of host physical machine set 1442, which is the universe of physical computers in or available to public cloud 1405. The virtual computing environments (VCEs) typically take the form of virtual machines from virtual machine set 1443 or containers from container set 1444. It is understood that these VCEs can be stored as images and can be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware and firmware allowing public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 1405 and private cloud 1406 are both part of a larger hybrid cloud.

The herein disclosure describes non-limiting examples of various embodiments. For ease of description or explanation, various portions of the herein disclosure utilize the term "each", "every", or "all" when discussing various embodiments. Such usages of the term "each", "every", or "all" are non-limiting examples. In other words, when the herein disclosure provides a description that is applied to "each", "every", or "all" of some particular object or component, it should be understood that this is a non-limiting example of various embodiments, and it should be further understood that, in various other embodiments, it can be the case that such description applies to fewer than "each", "every", or "all" of that particular object or component.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on a computer, partly on a computer, as a stand-alone software package, partly on a computer or partly on a remote computer or entirely on the remote computer or server. In the latter scenario, the remote computer can be connected to a computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality or operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

While the subject matter has been described above in the general context of computer-executable instructions of a computer program product that runs on a computer or computers, those skilled in the art will recognize that the one or more embodiments herein also can be implemented at least partially in parallel with one or more other program modules. Generally, program modules include routines, programs, components or data structures that perform particular tasks or implement particular abstract data types. Moreover, the aforedescribed computer-implemented methods can be practiced with other computer system configurations, including single-processor or multiprocessor computer systems, mini-computing devices, mainframe computers, as well as computers, hand-held computing devices (e.g., PDA, phone), or microprocessor-based or programmable consumer or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" or "interface" can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter described herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches or gates, in order to optimize space usage or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) or Rambus dynamic RAM (RDRAM). Also, the described memory components of systems or computer-implemented methods herein are intended to include, without being limited to including, these or any other suitable types of memory.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising:
a memory configured to store computer-executable components; and
a processor that executes at least one of computer-executable components that:
receives, via a user interface, a natural language question from a user;
converts, via semantic parsing, the natural language question into a logical query comprising a set of structured sub-queries;
generates a tailored knowledge graph based on the set of structured sub-queries associated with the natural language question, wherein the generating comprises iteratively, for respective structured sub-queries of the set of structured sub-queries:
converting, via an inverse of semantic parsing, the respective structured sub-query into a respective unstructured text,
fetching, from a document corpus, one or more respective unstructured documents corresponding to the respective unstructured text,
generating, using triplet extraction, a respective sub-answer for the respective structured sub-query, based on the one or more respective unstructured documents corresponding to the respective unstructured text,
inserting, based on the respective sub-answer, at least one of respective nodes or respective edges into the tailored knowledge graph;
identifies, using the tailored knowledge graph, an answer for the natural language question; and
provides, via the user interface, the answer to the user.

2. The system of claim 1, wherein the iteratively generating the tailored knowledge graph further comprises:
updates, via slot-filling, the logical query based on the respective sub-answer.

3. The system of claim 1, wherein the at least one of the computer-executable components further:
generates the answer based at least in part on an ontology associated with the natural language question.

4. The system of claim 1, wherein the at least one of the computer-executable components further:
ranks the one or more respective unstructured documents based on respective semantic similarity scores between the respective unstructured text and the one or more respective unstructured documents.

5. The system of claim 1, wherein the at least one of the computer-executable components further:
prunes one or more nodes or edges from the tailored knowledge graph based on relevance to the natural language question.

6. The system of claim 1, wherein the at least one of the computer-executable components further:
receives, via the user interface, confirmation or correction of the identified answer from the user.

7. The system of claim 1, wherein the at least one of the computer-executable components further:
outputs an explanation describing how the tailored knowledge graph led to the identified answer.

8. A computer-implemented method, comprising:
receiving, by a system operatively coupled to a processor, via a user interface, a natural language question from a user;
converting, by the system and via semantic parsing, the natural language question into a logical query comprising a set of structured sub-queries;
generating, by the system, a tailored knowledge graph based on the set of structured sub-queries, wherein the generating comprises iteratively, for respective structured sub-queries of the set of structured sub-queries:
converting, via an inverse of semantic parsing, the respective structured sub-query into a respective unstructured text,
fetching, from a document corpus, one or more respective unstructured documents corresponding to the respective unstructured text,
generates, using triplet extraction, a respective sub-answer for the respective structured sub-query, based on the one or more respective unstructured documents corresponding to the respective unstructured text,
inserts, based on the respective sub-answer, at least one of respective nodes or respective edges into the tailored knowledge graph;
identifying, by the system, using the tailored knowledge graph, an answer for the natural language question; and
providing, by the system, via the user interface, the answer to the user.

9. The computer-implemented method of claim 8, wherein the iteratively generating the tailored knowledge graph further comprises:
updating, by the system and via slot-filling, the logical query based on the respective sub-answer.

10. The computer-implemented method of claim 8, wherein the system generates the answer based at least in part on an ontology associated with the natural language question.

11. The computer-implemented method of claim 8, further comprising:
ranking, by the system, the one or more respective unstructured documents based on respective semantic similarity scores between the respective unstructured text and the one or more respective unstructured documents.

12. The computer-implemented method of claim 8, further comprising:
pruning, by the system, one or more nodes or edges from the tailored knowledge graph based on relevance to the natural language question.

13. The computer-implemented method of claim 8, further comprising:

receiving, by the system, via the user interface, confirmation or correction of the identified answer from the user.

14. The computer-implemented method of claim 8, further comprising:

outputting, by the system, an explanation describing how the tailored knowledge graph led to the identified answer.

15. A computer program product for facilitating question answering via tailored knowledge induction, the computer program product comprising a non-transitory computer-readable memory having program instructions embodied therewith, the program instructions executable by a processor to cause the processor to:

receive, via a user interface, a natural language question from a user;

convert, via semantic parsing, the natural language question into a logical query comprising a set of structured sub-queries;

generate a tailored knowledge graph based on the set of structured sub-queries, wherein the generating comprises iteratively, for respective structured sub-queries of the set of structured sub-queries:

converting, via an inverse of semantic parsing, the respective structured sub-query into a respective unstructured text, fetching, from a document corpus, one or more respective unstructured documents corresponding to the respective unstructured text, generates, using triplet extraction, a respective sub-answer for the respective structured sub-query, based on the one or more respective unstructured documents corresponding to the respective unstructured text, inserts, based on the respective sub-answer, at least one of respective nodes or respective edges into the tailored knowledge graph;

identify, using the tailored knowledge graph, an answer for the natural language question; and provide, via the user interface, the answer to the user.

16. The computer program product of claim 15, wherein the iteratively generating the tailored knowledge graph further comprises:

updating, via slot-filling, the logical query based on the respective sub-answer.

17. The computer program product of claim 15, wherein the program instructions are further executable to cause the processor to:

generate the answer based at least in part on an ontology associated with the natural language question.

18. The computer program product of claim 15, wherein the program instructions are further executable to cause the processor to:

rank the one or more respective unstructured documents based on respective semantic similarity scores between the respective unstructured text and the one or more respective unstructured documents.

19. The computer program product of claim 15, wherein the program instructions are further executable to cause the processor to:

prune one or more nodes or edges from the tailored knowledge graph based on relevance to the natural language question.

* * * * *